United States Patent [19]

Newbury

[11] Patent Number: 4,666,356
[45] Date of Patent: May 19, 1987

[54] CONTAINERIZATION SYSTEM, APPARATUS AND METHOD

[75] Inventor: Arthur D. Newbury, St. John's, Canada

[73] Assignee: Contrawl Limited, St. John's, Canada

[21] Appl. No.: 513,418

[22] Filed: Jul. 14, 1983

Related U.S. Application Data

[63] Continuation-in-part of Ser. No. 402,111, Jul. 26, 1982, Pat. No. 4,498,584.

[51] Int. Cl.$^4$ .................. B63B 27/12; B65G 57/03
[52] U.S. Cl. ........................... 414/30; 43/6.5; 114/255; 294/68.3; 294/81.5; 414/71; 414/140; 414/145
[58] Field of Search ............ 414/30, 71, 140, 145; 294/68.1, 68.3, 81.5, 81.52, 81.54; 43/6.5; 114/72, 255; 212/190

[56] References Cited

U.S. PATENT DOCUMENTS

| | | | |
|---|---|---|---|
| 2,440,307 | 4/1948 | Smith | 114/72 |
| 2,448,373 | 8/1948 | Hurst | 414/140 |
| 2,457,841 | 1/1949 | Smith et al. | 414/140 X |
| 2,513,004 | 6/1950 | Cooley | 114/0.5 |
| 3,034,659 | 5/1962 | Willison et al. | 414/140 X |
| 3,361,274 | 1/1968 | Goldman | 294/81.54 X |
| 3,687,309 | 8/1972 | Macrander | 414/140 |
| 3,807,582 | 4/1974 | Anderson | 414/139 |
| 4,043,285 | 8/1977 | Nordstrom | 414/140 |
| 4,138,961 | 2/1979 | Roper | 114/72 |

FOREIGN PATENT DOCUMENTS

| | | | |
|---|---|---|---|
| 89627 | 8/1960 | Denmark | 114/72 |
| 1113381 | 8/1961 | Fed. Rep. of Germany . | |
| 2724978 | 12/1978 | Fed. Rep. of Germany | 414/30 |
| 1004267 | 9/1953 | France . | |
| 2310275 | 12/1976 | France . | |
| 2340240 | 9/1977 | France . | |
| 967793 | 8/1964 | United Kingdom . | |

Primary Examiner—Leslie J. Paperner

[57] ABSTRACT

An apparatus for use in a system of containerized handling of fish onboard an ocean-going vessel. Fish are stored in closely stacking containers within the hold of the fishing vessel and are cyclically removed from within the hold to working positions on the deck of the vessel, where they are charged with fish and ice and returned to storage positions, by the cooperative use of an in-hold travelling hoist adapted to move a selected plurality of containers to and from chosen position within the hold compartment without disturbing other containers and an above-deck conveying system operable to convey the plurality of containers between a position inside the hold compartment directly below the hatchway through the deck overlying the hold compartment and a selected working position on the deck.

14 Claims, 36 Drawing Figures

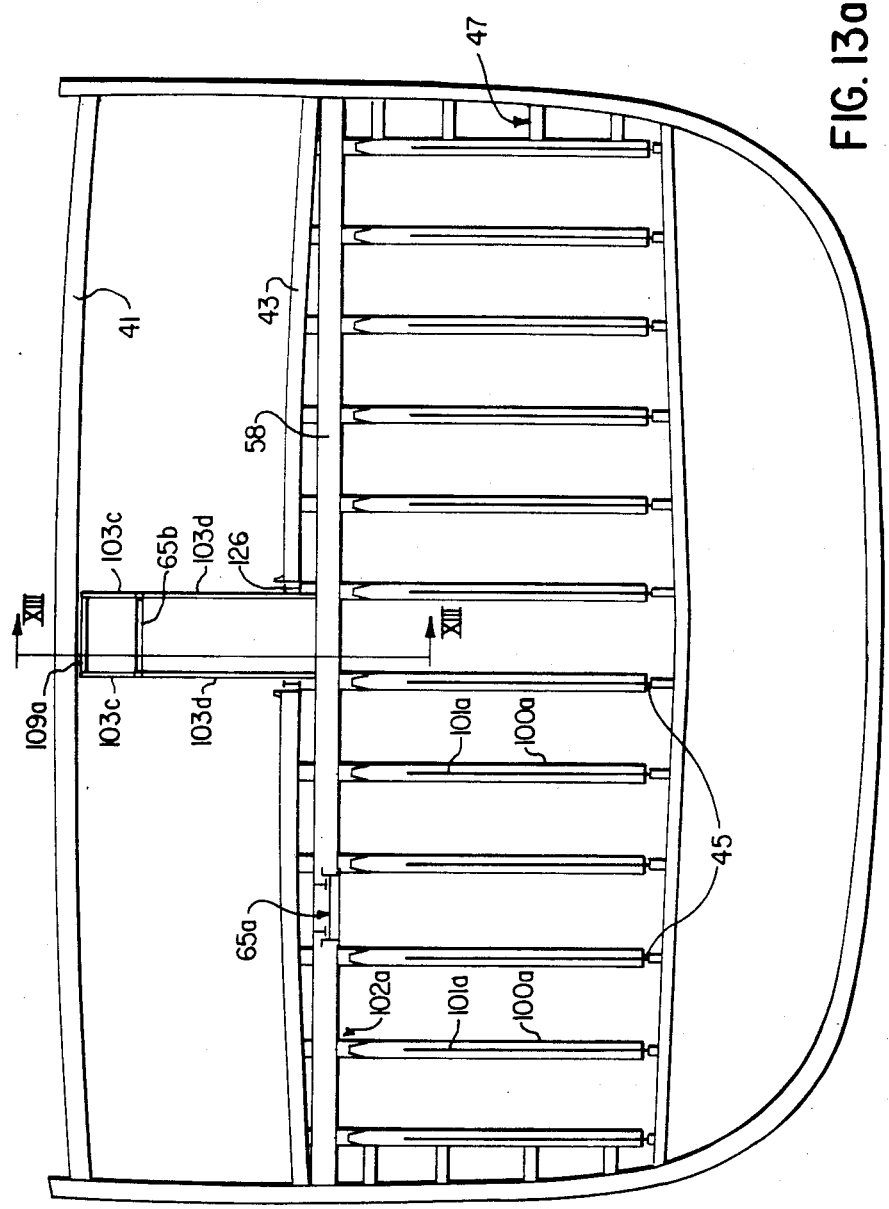

CONTAINERIZATION SYSTEM, APPARATUS AND METHOD

BACKGROUND OF THE INVENTION

This application is a continuation-in-part of U.S. patent application Ser. No. 402,111 filed July 26, 1982, now U.S. Pat. 4,498,584.

FIELD OF THE INVENTION

This invention relates to method and apparatus for the transfer of objects, closely packed within an enclosure, between the interior of the enclosure and selected positions on the top deck of the enclosure. More particularly, the invention relates to method and apparatus for transferring containers for the storage of fish in the hold of a vessel between the hold and the deck through a hatchway in the deck. The invention also relates to suitable such nesting containers, and to the containerized fish handling system comprising the containers, the transferring apparatus, and support and guiding structures within the hold of the vessel.

DESCRIPTION OF THE PRIOR ART

Known methods of holding fish onboard trawlers and discharging them from the hold are subject to a number of disadvantages.

One such method comprises the storage of fish below deck in large pens. Such pens are typically assembled during fishing operations by the fitting of corrugated aluminum boards (pen boards and shelving boards) into vertical stanchions permanently installed in the hold. Fish are subsequently removed by breaking down the pen boards and shelving and directing the loose fish to a conveyor system, air unloader or other impelling device to remove them from the hold. Storage of fish in pens utilizes space in the hold efficiently, but results in a deterioration of quality in the fish, arising in part from the considerable weight exerted on fish near the bottom of the pen by those above, and in part from physical damage that occurs during discharging.

Another method, which leads to the delivery to port of fish of a very high quality, employs the boxing of fish and ice in relatively small boxes (approximately 100 lb. capacity) and storage of such boxes by stacking them within the hold. However, boxing entails a high labour cost and the boxes employed and the manual procedures employed in their handling are volumetrically inefficient. Furthermore, neither boxing nor holding in pens lends itself to high rates of unloading fish from the hold.

Apparatus for handling fish containers to be stowed within the hold of a ship is disclosed in U.S. Pat. No. 2,448,373 (Hurst), which describes the gravity-controlled swinging of containers lowered into the hatchway towards either side of the hold by means of a system of ropes and pulleys. However, this system is not adapted to the rapid and volumetrically efficient storage and removal of the large number of relatively small, rigid containers required to ensure delivery of high quality fish to shore.

In accordance with the present invention, there is provided a system of containerized fish handling which overcomes the deficiencies of prior systems of handling fish on board an ocean going vessel. This system allows the storage of fish in containers of sufficiently small interior depth to ensure delivery to port of a high quality product, while at the same time achieving high volumetric efficiency of fish storage within a hold compartment of a fishing vessel and high rates of discharge of containers from or transfer to a hold compartment.

According to the containerized fish handling system of the present invention, fish are stored in each hold compartment of the vessel in closely stacking, vertically mating containers. Each container is provided with extended side walls between which nests the container arranged immediately above it. The side walls of each container are provided with apertures or other suitable gripping sites adapted to be engaged from above by gripping means positioned over the container and between the extended side walls, thereby allowing containers to be removed from the hold compartment and yet be stacked close together therein, so that the maximum storage capacity of the hold compartment for containers may be utilized.

The rapid and efficient transfer of containers between storage positions in the hold compartment and working positions above the deck overlying the hold of the vessel is achieved by the use of an in-hold travelling hoist to move a plurality of containers to and from selected positions within the hold compartment in co-operation with an above-deck conveying system, including an above-deck hoist, operable to convey the plurality of containers between a position interior of the hold compartment directly below an open hatchway in the deck and a selected working position on the deck. Each hoist is provided with a vertically movable lifting frame having extendible projections adapted for engagement with or release from the gripping sites of a plurality of containers arranged end-to-end in a horizontal row, so that a row of containers may be thereby lifted from the next underlying row without disturbing the containers stacked in rows adjacent to the sides or bottom of the row being lifted.

Transporter assemblies which utilize the principle of horizontal movement of a lifting device on a track and of hoisting and lowering therefrom for the purpose of lifting cargo from within a hold of a ship to dockside and vice versa are known in the art of materials handling, as in U.S. Pat. No. 2,591,140 (Dougherty), U.S. Pat. No. 3,543,952 (Young), U.S. Pat. No. 3,630,390 (Tax), U.S. Pat. No. 3,881,608 (Hupkes) and U.S. Pat. No. 3,946,881 (Ludvigsen). Travelling crane assemblies which further provide for fore-and-aft motion of the entire lifting unit are also known for use with container ships, as in U.S. Pat. No. 2,456,104 (Andersen), U.S. Pat. No. 2,984,367 (McIntyre) and U.S. Pat. No. 4,049,132 (Stromback).

The apparatus of the present invention differs from the prior art relating to marine transporter assemblies in disclosing a travelling hoist which operates beneath a deck of a fishing trawler at sea in co-operation with above-deck conveying apparatus in an efficient system for the transfer of containers suitable for the storage of fish between a working deck and selected locations in the hold.

Stackable, vertically interlocking packing or transport cases for the storage or transportation of fish in an ice-packed condition, which provide for outside drainage of melt water to prevent contamination of the contents of the lower container in a stack, are known. Examples of such containers are disclosed in U.S. Pat. No. 3,338,468 (Wilson), U.S. Pat. No. 3,366,273 (Crocell et al.) and U.S. Pat. No 3,447,716 (Nesse). Cases of this type are not, however, provided with extended, slotted side walls to impart transverse strength to a stack of nesting containers while allowing for grasping and lifting of a container by a mechanism operating between the side walls. Interior gripping ability allows an array of such containers to be lifted without disturbing adjacent containers. The mating fit between the pair of extended, slotted side walls of one such container and the bottom longitudinal recesses of a container stacked immediately thereabove, the recesses being formed by the bottom of each container having a reduced width, permits a relatively large percentage of the volume occupied by the extended side walls of the container to be recaptured in a stack of such containers, thereby affording a higher volumetric efficiency than has been achieved with no nesting containers. The arrangement of mating elements in the stackable container permits the close packing of large, insulated (i.e. thick-walled) containers designed for mechanical handling, while at the same time minimizing the effect of loss of each container's storage capacity. A disadvantage of known containers, particularly of the relatively smaller fish boxes, intended for manual handling, is a decreased volumetric efficiency resulting from the space occupied in a stack of such containers by the inter-engaging locking elements on the container. Higher stacking strength may be achieved by exterior vertical corrugations in the side walls of the container, which is further rigidified by a stiffener rod fastened between the side walls. The stiffener rod also provides support for a cover that fits closely between the side walls and curves over the end walls of the container in a frictional fit.

SUMMARY OF THE INVENTION

Directed generally to a method, apparatus and system for the efficient storage of objects within an enclosed space and their cyclical removal and replacement within that space, and particularly to the containerization and handling of fish on board an ocean-going vessel, the invention, in one aspect relates to a nesting container having a bottom wall, a pair of side walls extending upwardly from opposite sides of the bottom wall and a pair of end walls extending upwardly from opposite ends of the bottom wall, the container being configured and dimensioned at its top and bottom for mating engagement with the bottom and top, respectively, of similar vertically adjacent containers in a vertical stack. The side walls are provided with gripping sites in the vicinity of the upper portions thereof, adapted to be engaged by gripping means operating between the side walls, thereby allowing containers to be lifted without disturbing like containers stacked closely at the sides and ends of the container being lifted.

Another aspect of the invention is a nesting container for the storage of fish and ice within the hold of a fishing vessel, wherein the bottom portions of the side walls are inwardly recessed a sufficient amount that the bottom portion of such containers is of a reduced width dimensioned to be received between the extending upper portions of the side walls of a similar container stacked vertically therebelow. The vertical dimension of the bottom portion of the container of reduced width is slightly less than the vertical dimension of the upper portion of the side walls extending beyond the tops of the end walls. One of the vertical end walls has a drainage hole therethrough located immediately above the interior face of the bottom wall, to allow drainage of melting ice, and the container is further provided with an arrangement of parallel drainage grooves running vertically along the interior faces of the end walls and longitudinally along the interior face of the bottom wall to communicate with the drainage hole, so that liquid in the container flows along the drainage grooves and out the drainage hole.

It is a further aspect of this invention to provide apparatus for the transferring of objects between storage positions in the interior of an enclosure covered by a top deck having an opening therethrough narrower than the dimensions of the enclosure and at least one selected position on the top deck. The apparatus comprises in combination internal hoisting means disposed below the top deck of the enclosure, operable to convey the objects between a location directly below the opening and other locations within the enclosure, and external conveying means disposed above the top deck of the enclosure operable to convey the objects between the location within the enclosure directly below the opening and at least one position on the top deck of the enclosure.

In a further aspect of the invention for use aboard a fishing vessel having a hold compartment provided with a hatchway through the main deck overlying the hold compartment, apparatus is provided for transferring fish containers between storage positions in the hold compartment and at least one working position above the hold compartment. The apparatus comprises internal hoisting means disposed below the main deck of the hold compartment, operable to convey fish containers between a location directly below the hatchway and other storage positions within the hold compartment, and external conveying means disposed above the main deck of the hold compartment operable to convey the fish containers between a location within the hold compartment directly below the hatchway and at least one working position above the hold compartment.

In another of its aspects, the subject invention is a system for the containerization and handling of fish aboard a fishing vessel having a main deck, at least one hold compartment beneath the main deck and a longitudinal hatchway through the main deck extending in length over substantially the full length of the hold compartment. The system comprises in combination a plurality of similar stackable fish containers, each provided with cover means and having matching opposed flanges extending upwardly at opposite sides of the cover means, and further having a bottom portion configured for nesting engagement with the top flanges of a similar container stacked therebelow, the flanges being further provided with opposed gripping sites adapted for engagement by gripping means positioned over the cover means and between the two opposed flanges, whereby the top container of a stack of containers may be vertically lifted from the stack without disturbing containers in adjacent stacks, hoisting means disposed below the main deck and operable to selectively grip and release containers at their gripping sites and to convey them between selected positions within the hold compartment, and conveying means disposed above the main deck operable to selectively grip and release containers and to convey them between a location within the hold compartment directly below the hatchway and at least one working position on the main deck of the fishing vessel.

The invention in another of its aspects is a system for the containerization and handling of fish aboard a fishing vessel having a main deck, at least one hold compartment beneath the main deck and a longitudinal opening through the main deck extending in length over substantially the full length of the hold compartment, which comprises in combination, a plurality of similar stackable fish containers provided with cover means and matching flanges extending upwardly from each such container at opposite sides of the cover means, each such container being provided with opposed gripping sites adapted for engagement by gripping means positioned over the cover means between the two opposed flanges, the containers being configured and dimensioned for vertical mating engagement in a predetermined array of vertical stacks in close lateral contact within the hold compartment, each layer of any such vertical stacks comprising a predetermined number of such stackable containers in a longitudinal row, first hoisting means disposed below the main deck, operable to grip a single longitudinal row of containers positioned within the hold compartment, to raise or lower the row of containers and to transport the row of containers between selected positions within the hold compartment, the first hoisting means being operable to grip a single longitudinal row of containers positioned within the hold compartment, to raise or lower the row of containers and to transport the row of containers between selected positions within the hold compartment, including a position directly beneath and in alignment with the longitudinal opening through the main deck, and including a lifting frame vertically movable between the vicinity of the underside of the main deck and locations vertically spaced therebelow and horizontally movable between locations within the hold compartment when in the vicinity of the underside of the main deck, said lifting frame being dimensioned for placement between the opposed side flanges of a longitudinal row of containers, and gripping means mounted to said first lifting frame and operable to selectively engage and release the gripping sites of the containers in said longitudinal row, an array of vertical guide members transversely spaced along each end of the hold compartment and adapted to prevent undesired horizontal movement of the rows of containers, while permitting vertical movement of the rows of containers and permitting horizontal movement of the rows of containers when said rows have been raised to a location proximate the underside of the deck, and conveying means disposed above the main deck and operable to selectively grip and release a single longitudinal row of containers and to convey that row between a location within the hold compartment directly below the longitudinal opening and at least one working position on the main deck of the fishing vessel.

In a preferred embodiment of a system for the containerization and handling of fish aboard a fishing vessel according to the present invention, the conveying means disposed above the main deck includes stationary hoist means fixedly mounted over the hold compartment and operable to raise and lower a row of containers between a position within the hold compartment directly beneath the longitudinal opening through the main deck and a position above the main deck, the stationary hoist means including an upper hoist vertically spaced from the main deck and fixedly mounted thereabove, a second lifting frame, suspension means suspending the second lifting frame from the upper hoist, a power mechanism operatively connected to the suspension means for raising and lowering the second lifting frame, the second lifting frame having a plurality of vertical frame guides extending upwardly from the perimeter thereof, said vertical frame guides being operable to assist in stabilizing said second lifting frame when it is raised to a maximum elevation by the power mechanism, gripping means mounted to the second lifting frame and operable to selectively engage and release the gripping sites of the containers in a longitudinal row, movable object support means associated with the opening through the main deck, movable between an open configuration which permits a row of containers to pass through the opening, and a closed configuration in which the support means is operable to support a row of containers above the opening. In this preferred embodiment, the stationary hoist means also includes roller conveyor means operable to support containers being moved between a working position directly over the hold compartment and other locations on the main deck, and an array of second vertical guide members extending upwardly from the opening through the main deck toward the upper hoist associated therewith, the second vertical guide members being adapted to slidably engage the vertical frame guides of the associated lifting frame to prevent undesired horizontal movement of that lifting frame, while permitting its vertical movement.

Advantageously, the movable object support means associated with each opening through the main deck may also comprise roller-topped members so arranged that the roller-topped members and the roller conveyor means form a continuous track operable to support objects moved therealong when the movable object support means is in its closed configuration.

The invention is also, in another of its aspects, a method for charging containers with fish and ice and stowing them in a vessel equipped with a system of stackable fish containers, first hoisting means, vertical guide members and conveying means, comprising the steps of transferring rows of containers, empty of fish, from the hold compartment to a working position, charging them with fish and ice, returning them to the hold compartment, and restacking them therein, by use of the conveying means and first hoisting means, proceeding row by row and stack by stack in a cyclical series of operations, without moving charged containers after they have been restacked in the hold compartment.

The detailed description is separated into descriptions of original embodiments of the apparatus, presently preferred embodiments of the apparatus, and the operation of a fishing trawler provided with alternative embodiments of hoisting apparatus used in the trawler containerization system of the invention.

BRIEF DESCRIPTION OF THE DRAWINGS

In the drawings which illustrate embodiments of the invention, and in which like reference numberals refer to like structural components throughout.

FIG. 13a is a transverse vertical sectional view of a typical hold compartment fitted with a presently preferred arrangement of below and above-deck restraint devices.

FIG. 13b is an expanded cross-sectional view along the section XIII—XIII of FIG. 13a.

FIG. 14b is a cross-sectional view along the section XIVb—XIVb of FIG. 14a.

FIG. 16b is a fragmentary perspective view of a preferred embodiment of upper lifting frame for use with the above-deck stationary hoist of FIG. 16a.

DESCRIPTION OF ORIGINAL EMBODIMENTS OF APPARATUS

Figure 1:
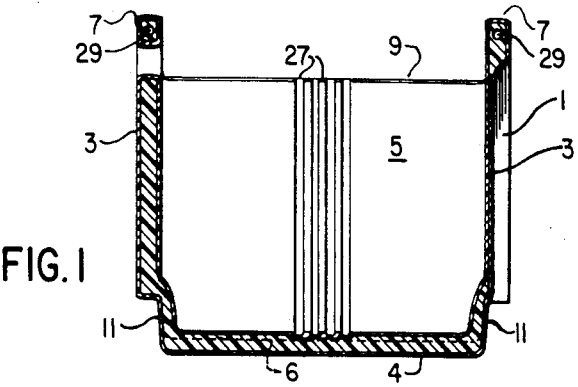
FIG. 1 is an end elevational sectional view of a fish container for use in the containerization system of the present invention.
Figure 2:
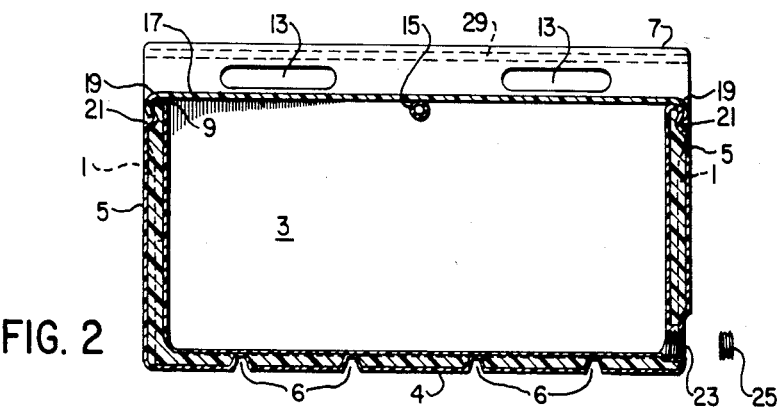
FIG. 2 is a side elevational sectional view of the container of FIG. 1, including a snap-on cover and horizontal grooves in the end walls for securing the cover.
Figure 3:
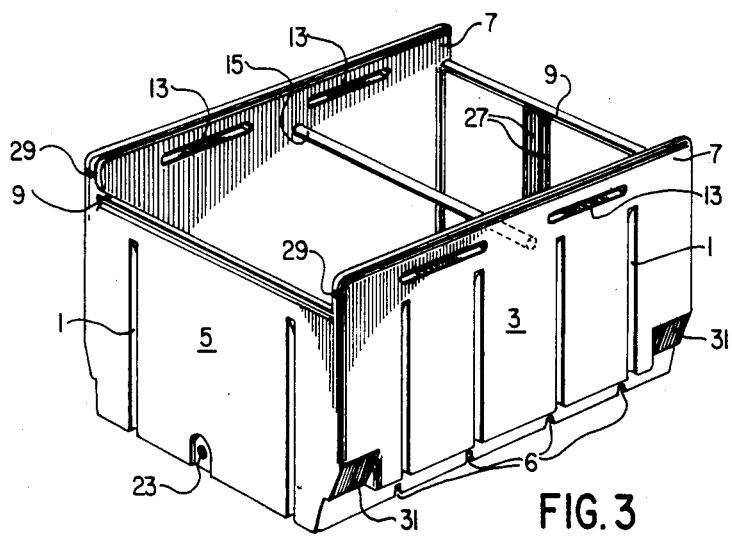
FIG. 3 is a perspective view from above and to one side of the container of FIG. 1, without a cover.

A nesting container for use in the storage and handling of fish on a fishing trawler using the method and apparatus of the present invention is illustrated in FIGS. 1 to 3.

Such a container is preferably of double-wall construction and fabricated of high density polyethylene or other high strength material suitable for contact with foodstuffs. Polyurethane insulation may be foamed into place within the double walls during fabrication to further rigidify the structure and to reduce the melting of ice packed with fish into the container.

The vertical stacking strength of the containers is enhanced by the inclusion of a series of exterior vertical corrugations 1 formed in side walls 3 and end walls 5, as best seen in FIG. 3. Bottom wall 4 is strengthened by a series of exterior horizontal corrugations 6, seen in cross-section in FIG. 2.

The upper portions 7 of the side walls 3 extend vertically beyond the tops 9 of the end walls 5. The bottom portions 11 of the side walls 3 are inwardly recessed a sufficient amount that the bottom portion of the container is of a reduced width dimensioned to be received between the extending upper portions 7 of the side wall 3 of a similar container container stacked vertically therebelow.

Preferably, the vertical dimension of the bottom portion of the container of reduced width is slightly less than the vertical dimension of the upper portions 7 of the side walls 3 extending beyond the tops 9 of said end walls 5 to allow for the thickness of container covers, described below, in the stacking of containers one above the other. However, the aforeentioned vertical dimension should be no less than is necessary to permit the undersides of the side walls of a container to abut against the upper portions 7 of the corresponding side walls of a container stacked immediately therebelow, so that the volumetric efficiency of stacking is maximized. One disadvantage of prior known stackable containers arises from the fact that the wall portions having hand holes or other gripping sites take up undue space. With stackable containers having the configuration depicted in FIGS. 1-3, a large percentage of the volume occupied by the gripping sites is regained in the vertically overlapping nesting of such containers in a stack. For ease of nesting and separation of containers stacked one above the other, the recessed bottom portions 11 of the side walls 3 are preferably sloped slightly outwardly from the bottom as seen in FIG. 1.

Through each of side wall upper portions 7 there is a pair of longitudinal slots 13 opposed to a corresponding pair of slots in the opposite side wall portion. As will be described in more detail below with reference to the hoisting systems of the present invention, these slots through extended side wall portions impart to a container the ability to be lifted from the top of a stack of such containers without disturbing like adjacent containers disposed below, to either side or to either end of the container being lifted.

Added strength along the parallel side wall portions extending above the upper edges of the end walls is achieved by the inclusion of an elongate stiffening member 15 fastened at opposed locations on the interior surfaces of the side walls so that the top surface of member 15 lies in a horizontal plane with the upper edges 9 of the end walls of the container. Member 15 is preferably a polyethylene pipe cross member welded at each end to opposite locations on the interior faces of side walls 3. Each container is provided with a cover 17 dimensioned for close fit between the extended portions 7 of the parallel side walls. As best seen in FIG. 2, the cover is supported at its ends by the upper edges of the end walls, and centrally by the stiffening member. Cover 17 is provided with end tabs 19, which turn down over the end walls of the container in a snap fit in horizontal grooves 21 in the exterior faces of end walls 5. Cover 17 may simply be a sheet of high density polyethylene of sufficient thickness and strength to retain the contents of fish and ice during rolling motion of the trawler at sea. The cover also serves to prevent contamination of the contents of a container.

Each container is provided with a drainage hole 23 through one of the end walls 5 to allow water formed by the melting of ice within a container to drain along the outside of the end walls of containers stacked below. The bore of hole 23 is screw-threaded to allow insertion of a threaded drainage plug 25. Melt water within a container is internally drained towards drainage hole 23 along an arrangement of parallel drainage grooves 27 running vertically along the interior faces of end walls 5 and longitudinally along the interior face of bottom wall 4 to communicate with drainage hole 23.

Figure 5A:
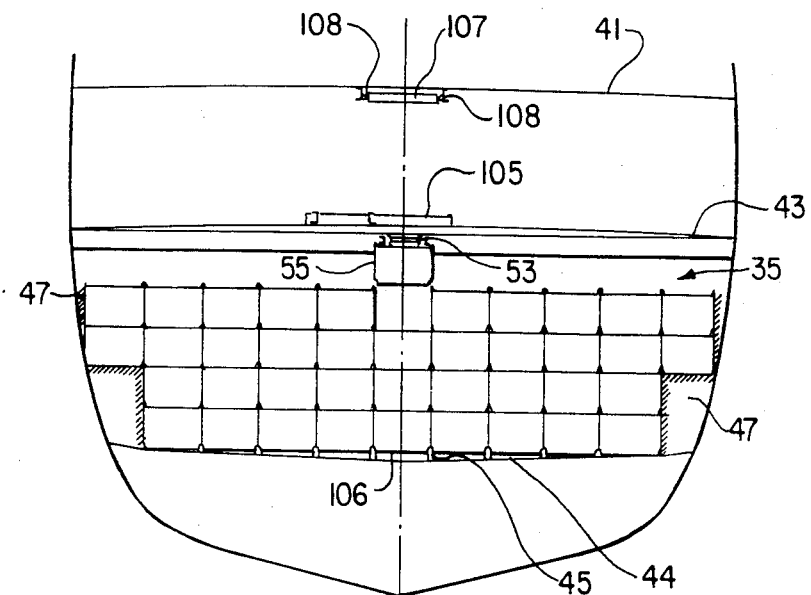
FIGS. 5a to 5d are cross-sectional views through a hold compartment along the line V—V of FIG. 4, showing the disposition of containers at various stages of the handling operation and further showing the cooperating hoist systems.
Figure 5B:
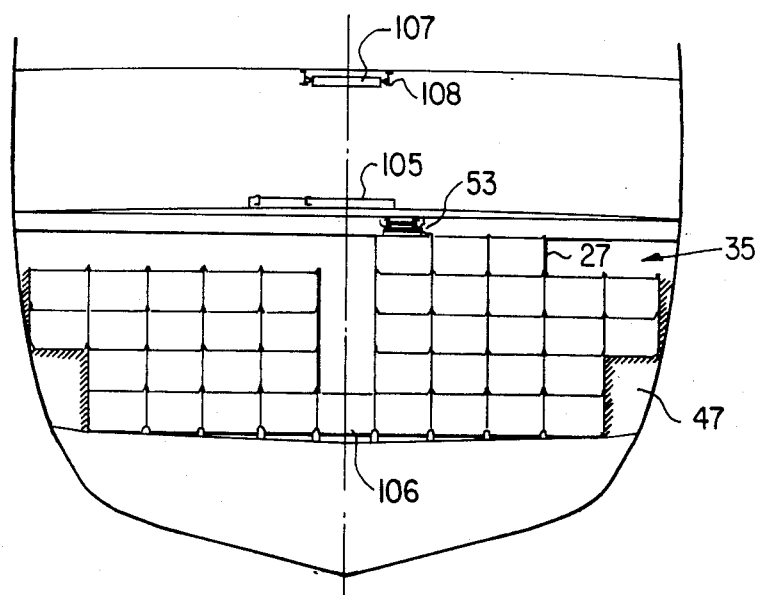
Figure 5C:
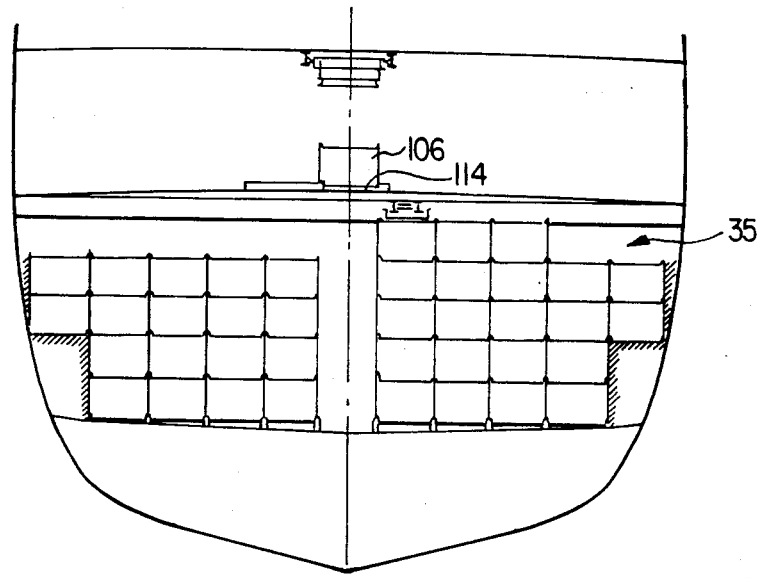

As shown in FIG. 5c, at various times during the operation of the system, as hereinafter described in detail, there will be empty space between two vertical stacks of containers. The end containers of each row are retained against undesired lateral movement by engagement with vertical T-section members, also hereinafter described in detail. To prevent dislodgement by motion of the ship of the interior containers of a row adjacent to the vacated space, at least the containers constituting each row of the second layer from the top of a hold compartment are secured together by removable connecting means which may be released when such a row of containers is placed on deck for loading with fish and ice. The connecting means used may comprise channel connectors adapted to be snapped over adjacent extended side wall portions of containers within the longitudinal row, or a removable dowel rod inserted through a longitudinal channel extending through matching openings in the extended side wall portions of the containers in the row, or any other convenient connecting means. In FIG. 1, side wall portions 7 are shown as provided with longitudinal holes 29, to accommodate securing dowel rods.

To facilitate the entry of the container between the T-section members described below when the container is being lowered into position, the side walls 3 of the container are preferably provided with tapered guide portions 31, as best seen in FIG. 3.

Figure 4:
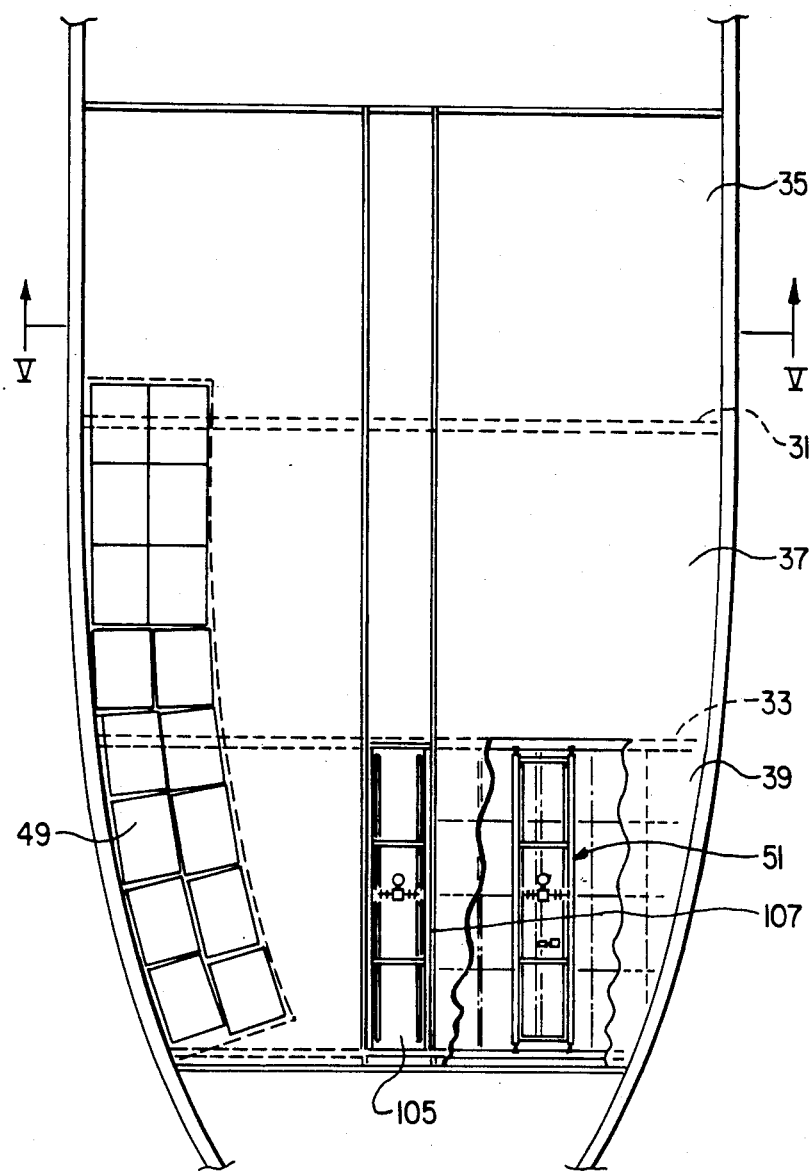
FIG. 4 is a top plan view, partly broken away, of the factory deck of a fishing trawler equipped with a containerrization system according to the present invention.

In accordance with the present invention, a trawler fish hold is divided across its length into a plurality of fish hold compartments (three or four, depending on the overall length of the hold). As shown in FIG. 4, partitions 31 and 33 divide the hold into compartments 35, 37 and 39, of which 35 is the largest owing to curvature of the hull of the vessel.

A cross-sectional view across hold compartment 35 is shown in FIG. 5a, illustrating the upper deck 41 which lies spaced above the main or factory deck 43. A plurality of identical nesting containers is shown stacked within hold compartment 35. Containers stacked within a hold compartment are arranged in longitudinal rows each containing a predetermined number of containers that depends upon the relative length of the hold compartment and a container.

As will be described in more detail below, according to the working of the present invention, the largest hold compartment is not entirely filled with containers when the trawler leaves port. Rather, as seen in FIG. 4, the topmost layer of containers for that hold compartment is stored above the deck of the vessel in a container storage system 49, which is preferably located above the working decks of the smaller hold compartments disposed toward the fore of the vessel. The vacant top layer space over the remaining containers within the largest hold compartment enables the temporary storage of all the rows of containers from any vertical stack, within this top layer space, preparatory to their removal to the above-deck charging area. In the preferred embodiment, the number of rows which can be accommodated across the top layer is sufficiently great relative to the number of rows comprising any vertical stack to permit storage of all the rows of the vertical stack in the vacant top layer space below and to one side of the hatchway.

For the moving and placement of containers located beneath the factory deck, each hold compartment is provided with internal hoisting means disposed below the factory deck and operable to convey fish containers between a location directly below the hatchway and other storage positions within the hold compartment. In the original embodiment, the internal hoisting means is a transverse travelling hoist, which is described below with reference to FIGS. 4, 6, 7, 8, 9, 10, 11, 12 and 13.

In FIG. 4, the transverse travelling hoist associated with hold compartment 39 is indicated at 51. The transverse travelling hoist associated with hold compartment 35 is indicated at 53 in FIG. 5a, engaging and suspending a longitudinal row of containers 55.

The structure of in-hold transverse travelling hoist 53 is shown in detail in FIGS. 6, 7, 8, 9, 10, 11, 12 and 13. As best seen in FIGS. 6, 7, 8, 9 and 10, hoist 53 comprises a rectangular travelling framework 56, having four idle rollers 57 mounted at its four corners for travel along a pair of transverse tracks 58 affixed to the underside of working deck 43 along opposite ends of hold compartment 35.

Framework 56 carries two similar motor and gear reducer combinations 59 each operatively connected to a circular toothed pinion 61 which engages the teeth of corresponding rack section 63. Rack sections 63 are affixed to opposite transverse tracks 58.

Motion of framework 56 along tracks 58 in either transverse direction, and its placement at a selected lateral position along the underside of the working deck, may be effected by actuating, stopping or reversing the motor/reduction gear combinations 59.

Figure 7:
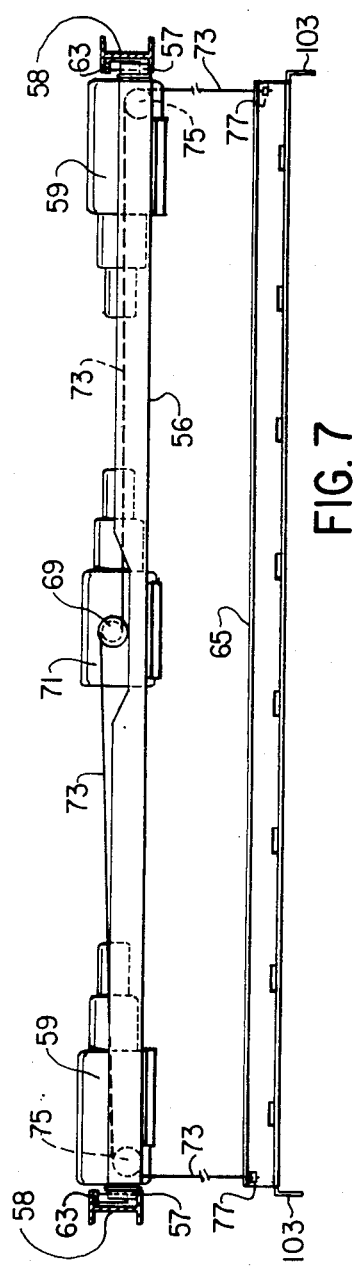
FIG. 7 is a side elevation view of the travelling framework of FIG. 6 seen along the section VII—VII showing the lifting frame suspended from the travelling framework.

Transverse travelling hoist 53 also comprises a rectangular lifting frame 65, shown in side elevational view in FIG. 7, suspended below travelling framework 56.

Lifting frame 65 is adapted to engage a longitudinal row of containers running the length of a hold compartment. Vertical travel of frame 65 is effected by means of a four-drum winch 69 mounted on transverse travelling framework 56 and powered by a third motor/reduction gear combination 71 centrally mounted on framework 56. The rotation of winch 69 extends or retracts cables 73 which are looped over four pulleys 75 disposed towards the four corners of framework 55 and attached by any convenient means to corresponding corners of lifting frame 65, as shown at 77 in FIG. 7. When cables 73 are retracted so that lifting frame 65 is at its maximum elevation, lateral oscillations of frame 65 are prevented by the abutting proximity of frame 65 to travelling framework 56.

Figure 11:
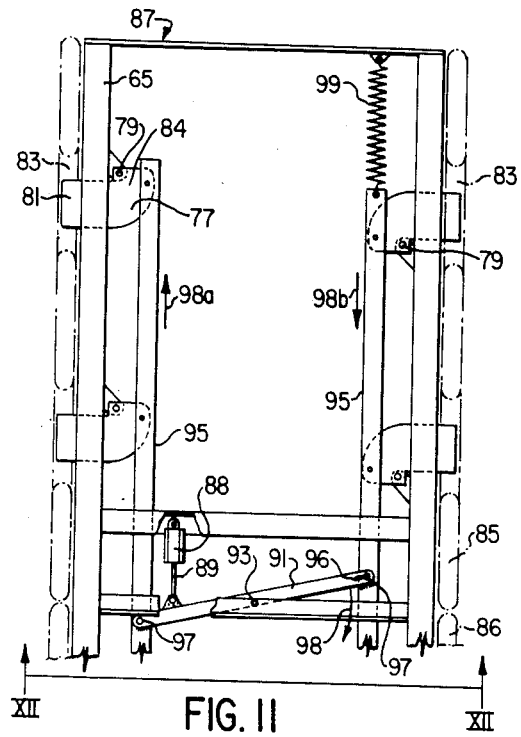
FIG. 11 is an enlarged fragmentary view of a lifting frame such as that associated with either the in-hold transverse travelling hoist of FIG. 7 or the above-deck longitudinal travelling hoist of FIG. 16.
Figure 12:
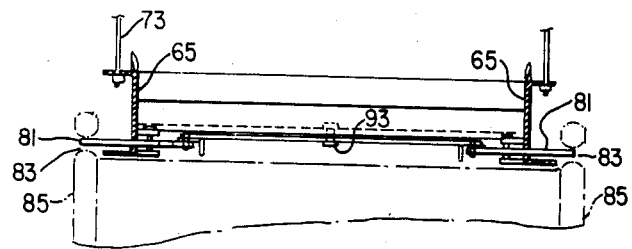
FIG. 12 is a cross-sectional view along the section XII—XII through the lifting frame of FIG. 11.

Details of the container pick-up means with which lifting frame 65 is provided are shown in FIGS. 11 and 12. Lifting frame 65 includes opposed pairs of container-engaging lugs projecting from members 77 pivotally mounted on pins 79 along the long sides of frame 65. Each lug presents a container engaging portion 81 which projects outwardly beyond the long side of frame 65 at one extreme of the pivotal movement of the member 77, to permit engagement with a matching slot 83 through the side wall of a container. In FIG. 12, the container-engaging lugs are shown in the engaged position.

Each lug-carrying member 77 comprises a lever portion 84 extending towards the interior of lifting frame 65. By exertion of a longitudinal force against lever portioOs 84, it may be seen that the container-engaging lugs can be extended to engage, or retracted to disengage with slots 83 in the containers 85 and 86. The two pairs of matching opposed lugs nearest end 87 of lifting frame 65 in FIG. 11, correspond to the four slots through the extended side walls of a single container 85. Container 86 next adjacent the end of container 85 in the longitudinal row of containers is likewise engaged through its four slots by the next four lugs, etc.

Only the linkages involved in engaging the first container in a longitudinal row are completely shown, as the pattern of lugs and the manner in which they are linked repeats over the length of lifting frame 65. The length of the frame and hence the number of quartets of lugs positioned to engage a single container will depend upon the length of the particular hold compartment and the number of containers placed end-to-end in a longitudinal row accommodated by that hold compartment.

The simultaneous engagement or disengagement of all the lugs from the row of containers between whose extended side walls lifting frame 65 is positioned is effected by the action of a pneumatic cylinder 88 and piston 89 combination powered by an air compressor and air receiver unit (not shown) carried on frame 65. Piston 89 is pivotally linked to cross member 91 which is adapted to pivot about a centrally located pin 93 in response to longitudinal movement of piston 89. All container-engaging lugs along either side of frame 65 are constrained to move in unison by pivotal connections of the lever portions 84 of the associated members with a longitudinal coupling member 95 linked to pivoting cross member 91 at opposite ends thereof by pins 97. Pins 97 are situated within slots 96 in the ends of pivoting member 91, thereby allowing for the slight transverse movement of cross member 91.

As viewed in FIG. 11, retraction of piston 89 causes cross member 91 to move in the sense indicated by arrow 98, thereby moving coupling members 95 in opposite longitudinal directions, as indicated by arrows 98a and 98b, and moving the container-engaging lugs to the retracted (disengaged) position. Extension of piston 89 causes the lugs to extend and engage slots 83 in container 85.

A spring 99 connects coupling member 95 to the end 87 of frame 65 to exert a biasing force on the lugs toward the engaged position. In the event of an accidental loss of power to air cylinder 88 when lifting frame 65 is carrying a row of containers, spring 99 maintains the lugs in the engaged position and the undesired release of the containers is averted. It will be understood that other linear actuator means than the above-described pneumatic cylinder and piston combination could be employed to effect the desired engagement or disengagement of the lugs.

The removal of containers from and their replacement into a hold compartment of a fishing trawler at sea requires restraint devices within the hold to ensure that containers will not be thrown into unfilled spaces or damaged by lateral swinging of the suspended lifting frame on the in-hold travelling hoist in the event of rolling of the vessel. The original embodiment of these restraint devices is described below with reference to FIGS. 13, 14 and 15.

Figure 13:
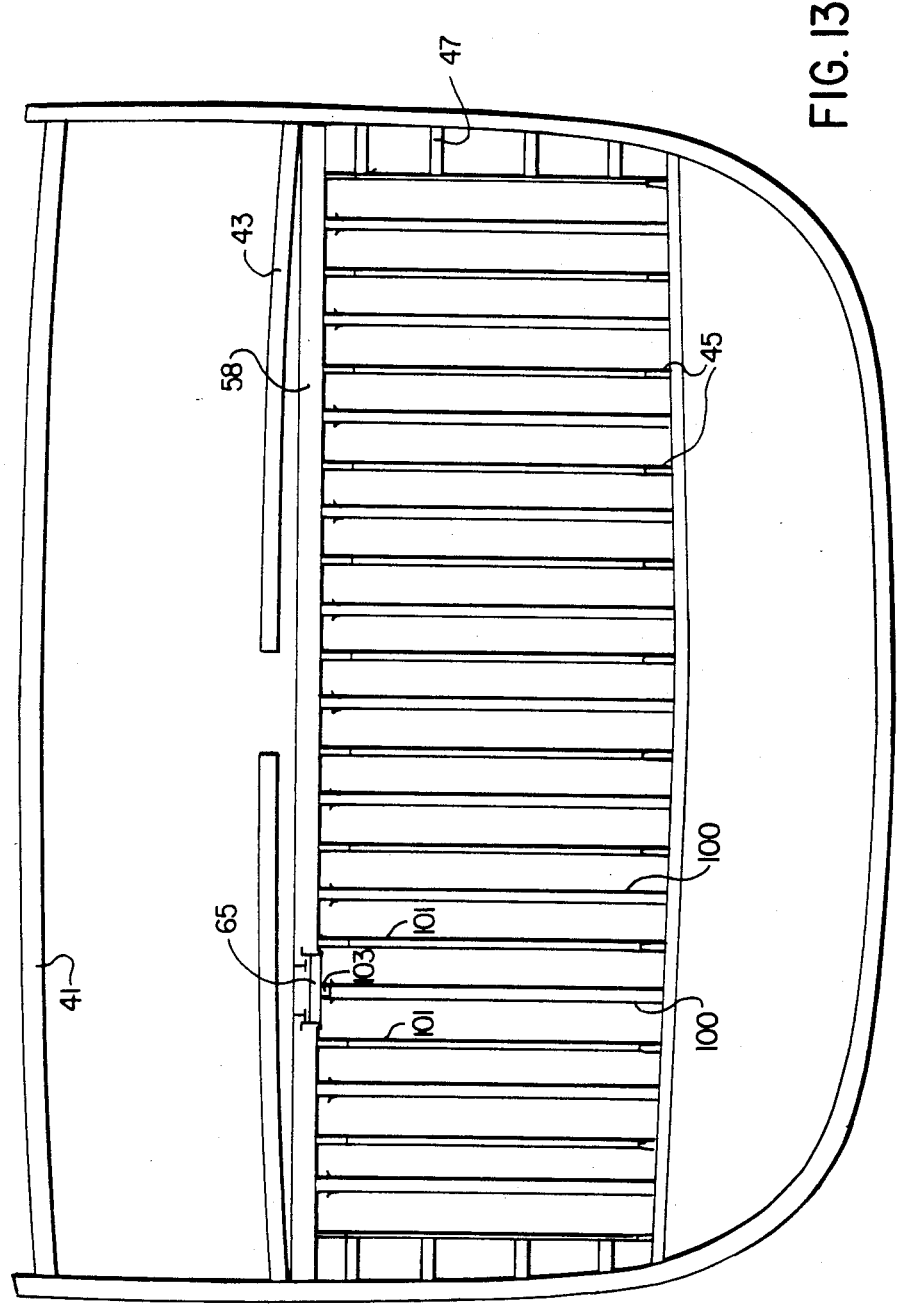
FIG. 13 is a transverse vertical sectional view of a typical hold compartment empty of containers according to an original embodiment of the invention.
Figure 14:
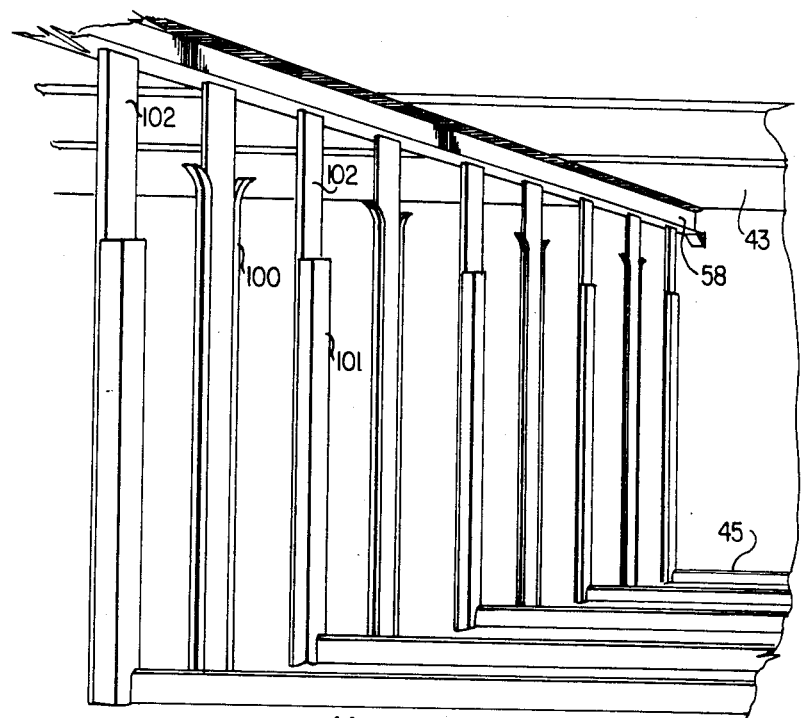
FIG. 14 is a partial perspective view of the hold compartment of FIG. 13, showing the vertical guide members located along one end of the hold compartment and a transverse beam for supporting the travelling framework of FIG. 6.

As seen in FIGS. 13 and 14, the partition between adjacent hold compartments comprises an arrangement of parallel guides and supports extending from the bottom of the hold up to the main beam beneath the factory deck. FIGS. 13 and 14 provide a sectional view and a perspective view, respectively, of a typical hold compartment, empty of containers so that the alternating set of vertical channel guides 100 and T-section members 101 may be seen. A hold compartment is bounded at its front and back ends by two such sets of opposed channel guides and T-section members. As may best be seen in FIG. 14, each channel guide 100 and each T-section member 101 is associated with a flat vertical partition portion 102 extending from the floor 44 of the hold compartment upwardly to meet the transverse track 58 mounted against the underside of main deck 43.

Figure 15:
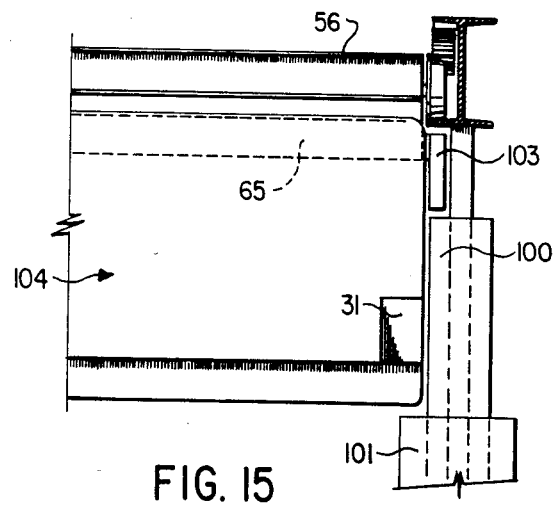
FIG. 15 is a fragmentary side elevational view of an in-hold transverse travelling hoist with lifting frame engaging a container at the top extent of its vertical travel within a hold compartment having the original arrangement of below-deck restraints illustrated in FIG. 14.

As shown in FIGS. 14 and 15, the vertical extent of the channel guides 100 and T-sections 101 is such that lifting frame 65 is restricted to vertical movement, except when raised to the top extent of its travel, by the engagement of projecting members 103, centrally located at either end of lifting frame 65, within the vertical channel of channel end guide 100. When raised to the top limit of its travel, lifting frame 65 is in close proximity to the travelling framework 56, and so restrained against lateral oscillation with respect to travelling framework 56.

As may be seen from FIG. 15, container 104, a container at the end of a longitudinal row of containers engaged by lifting frame 65, is itself restrained from transverse movement when positioned below its highest point of vertical travel within the hold by the two vertical T-section guides 101 located at either side of container 104.

In ordinary use in the container-handling method of the present invention, a below-deck transverse travelling hoist is moved across a hold compartment only when the lifting frame 65 is drawn up against transverse travelling frame 56. In this retracted position the row of containers engaged by the lifting frame and the lifting frame itself are clear of the lateral restraints presented by the vertical channel guide and T-section members, but are stabilized by proximity to the travelling frame and the transverse tracks along which it moves. Whenever the lifting frame is lowered vertically into the hold, however, accidental lateral swinging movement of the frame and engaged containers is prevented by the arrangement of vertical guides described above.

As seen in FIGS. 4 and 5a, each hold compartment presents a longitudinal hatchway 105 through working deck 43 overlying the hold compartment. Hatchway 105 is centrally disposed over the predetermined storage location of one vertical stack of containers 106, so that the uppermost longitudinal row of containers of stack 106 may be vertically lifted from the interior of the hold compartment through hatchway 105 to a position directly above the hatchway.

Conveying means external to the hold compartment are operable to convey fish containers between a location within the hold compartment directly below the hatchway and at least one working position on the main deck of the hold compartment. In one embodiment of the invention, the above-deck components of the container handling apparatus of the present invention, which effect the raising and lowering of a longitudinal row of containers positioned within a hold compartment directly below the hatchway of that hold compartment and the transportation of the row of containers to and from selected locations on the working deck, include a longitudinal travelling hoist.

As seen in FIG. 5a, longitudinal travelling hoist 107 is mounted next to the underside of upper deck 41 on parallel longitudinal tracks 108 straddling hatchway 105.

Figure 16:
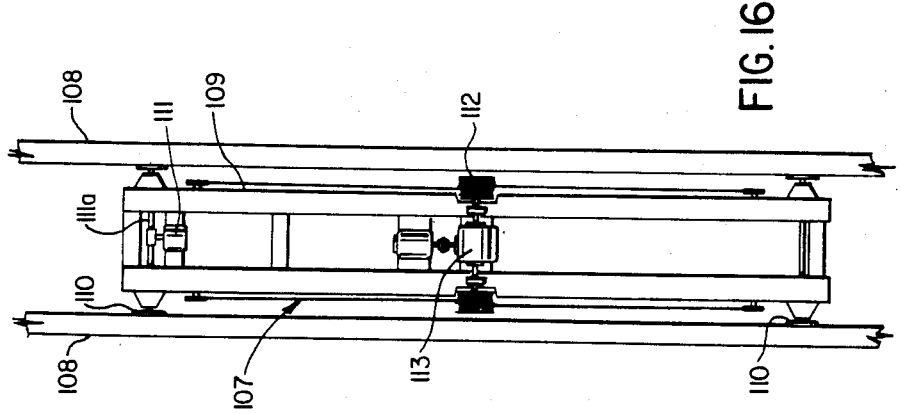
FIG. 16 is a top plan view of the travelling framework of the above-deck longitudinal travelling hoist mounted for travel along longitudinal tracks affixed to the underside of the upper deck of a fishing trawler.

An enlarged top plan view of above-deck longitudinal travelling hoist 107 is shown in FIG. 16. Travelling hoist 107 includes a rectangular travelling framework 109, having four idle rollers 110 mounted at its four corners for travel along tracks 108. Travelling framework 109 is powered to move along tracks 108 by means such as a motor drive and reduction gear combination 111, the drive shaft 111a of which is linked at its ends to rack-and-pinion drive mechanisms similar to that of transverse travelling framework 56, described above.

Longitudinal travelling hoist 107 also includes a rectangular lifting frame and gripping means of like construction to rectangular lifting frame 65, described in connection with FIG. 11. Vertical travel of the lifting frame associated with longitudinal travelling hoist 107 is effected by means of a four-drum winch 112 mounted on longitudinal travelling framework 109 and powered by a motor/reduction gear combination 113, in a manner similar to the lifting mechanism described in relation to the below-deck transverse travelling hoist described above.

Travelling hoist 107 may be positioned over the hatchway of each successive hold compartment to move a longitudinal row of containers therefrom or to deposit a row of containers vertically into the hold compartment directly below the hatchway, whence it may be engaged and transported laterally to selected positions within the hold by the in-hold transverse travelling hoist 53.

Figure 17:
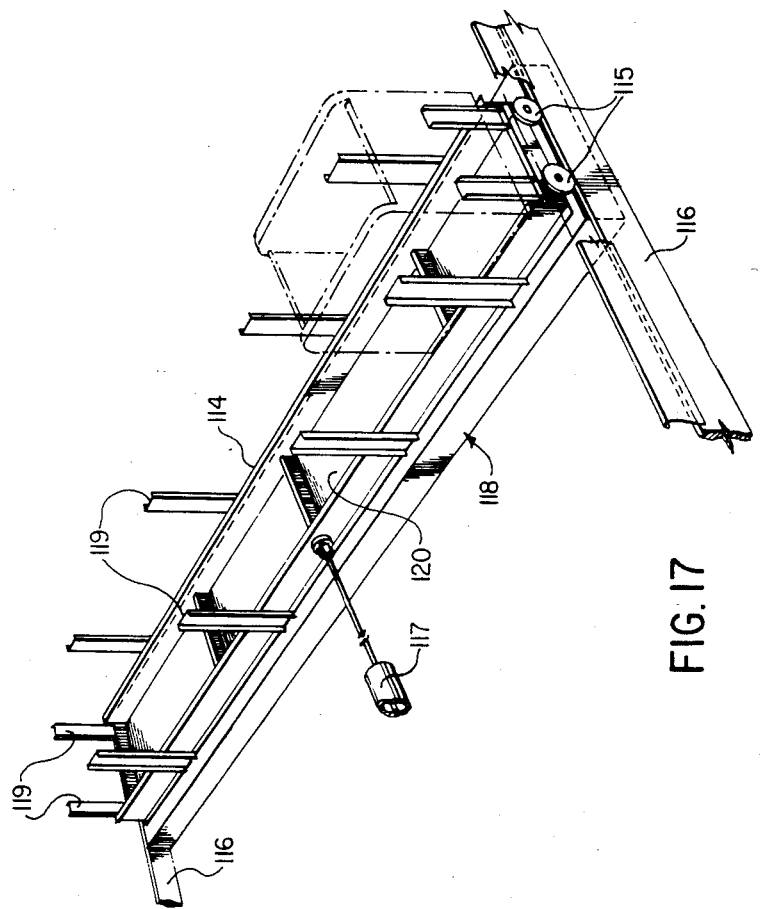
FIG. 17 is a perspective view of a transverse moving framework mounted on the factory deck in the vicinity of the hatchway through the deck.

At least one hold compartment is provided with travelling support means, operable to convey containers between a location above the main deck directly over the hatchway and a working position to one side of the hatchway. In one embodiment, the placement on the working area of the factory deck of a row of containers is effected by providing at least one hold compartment with an above-deck transverse moving frame unit 114 which acts in co-operation with above-deck longitudinal travelling hoist 107. As shown in FIG. 17, transverse moving frame 114 is provided at its four corners with rollers 115 mounted for movement along parallel transverse segments 116, whereby frame 114 may be positioned by suitable drive means such as hydraulic drive 117 for lateral positioning of the framework directly over hatchway 105 or displaced from hatchway 105 toward a separate container storage and fish loading area on the factory deck. In FIG. 17, frame 114 is shown positioned over the hatch coaming 118 defining the opening of hatchway 105. Frame 114 is provided around its periphery with spaced vertical members 119 to guide containers into the frame and to provide lateral support.

When a row of containers has been lifted from within a hold compartment by travelling hoist 107, transverse moving frame 114 may be positioned over hatchway 105 directly beneath the row of containers held by the above-deck travelling hoist. The containers may then be lowered into frame 114 onto supporting platform portion 120, in the position shown in broken lines in FIG. 17, for transverse movement into positon for filling with fish and ice. By reversing this operation, a row of containers so filled may be replaced into the hold compartment.

Alternatively, a row of containers lifted from within a hold compartment and lowered into frame 114 positioned directly over hatchway 105 may be filled with fish and ice while held in frame 114 directly over hatchway 105, platform 120 of frame 114 serving as both a loading station and as a temporary cover over hatchway 105 to prevent fish and ice from falling into hold compartment 105.

DESCRIPTION OF PRESENTLY PREFERRED EMBODIMENTS OF APPARATUS

On the basis of further experimentation, modifications have been made to the apparatus of the invention for improving the operation of the invention installed in a fishing trawler. The principle of operation of the system is unchanged by these modifications to the apparatus; as with the original embodiments described above, fish containers are transferred between storage positions in the hold compartment and at least one working position above the hold compartment by the cooperative use of internal hoisting means disposed below the main deck and external conveying means disposed above the main deck.

The presently preferred embodiments differ from the original firstly in providing a modified construction of restraint devices located within the hold of a ship and corresponding modifications to the lifting frames of the internal hoisting means and the external conveying means. Further, there is now provided a system of above-deck restraint devices for the lifting frame of the external conveying means. As described below, the preferred arrangement of above and below-deck restraint devices prevents undesired swinging of this lifting frame at all positions along its vertical path of travel.

Secondly, in the presently preferred embodiment the external conveying means includes roller conveying means for conveying containers between hold compartments in the cyclical container handling method of the invention.

Finally, a preferred alternative construction of internal hoisting means operable to convey fish containers between a location directly below the hatchway over a hold compartment and other positions within the hold compartment is described. This construction of internal hoisting means dispenses with the travelling framework of the original embodiment of internal hoisting means. Instead, the lifting frame is carried by a pair of opposed carriers running in transverse channelled tracks mounted just below the factory deck. The transverse movement of carriers and lifting frame and the raising and lowering of the lifting frame are both effected by a drive unit located on the factory deck. By dispensing with the requirement for a travelling framework like that shown at 56 in FIGS. 6 and 7, more below-deck storage space proximate to the underside of the deck is provided.

(1) Presently Preferred Embodiments of Below-Deck Restraint Devices

Figure 14A:
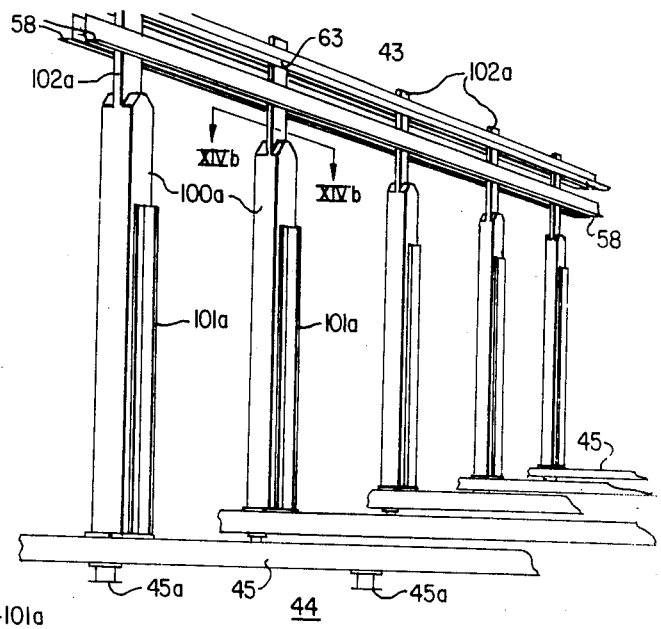
FIG. 14a is a partial perspective view of the hold compartment of FIG. 13a, showing the presently preferred vertical guide members located along one end of a hold compartment and the bottom container supports.

The arrangement of below-deck restraint devices in a presently preferred embodiment of the invention is illustrated in FIGS. 13a and 14a which present views of a typical hold compartment, empty of containers, and correspond respectively to FIGS. 13 and 14 illustrating the original embodiment described above.

An array of flat vertical deck support columns 102a extends upwardly from the top surfaces of the longitudinal frame members 45. Members 45 constitute a framing suitable to support that layer of containers nearest the bottom 44 of the hold compartment at a uniform height. As seen, containers nearest the sides of the hold compartment are kept in position by side supports 47 which prevent their falling over or being dislodged towards the curved sides of the vessel. The vertical deck support columns 102a are supported from below by bottom beam supports 45a which may be integral with the hull of the ship or with the top of fuel oil storage tanks. As seen in FIGS. 13a and 14a, each support column 102a extends upwardly to meet the underside of main deck 43 after passing between the transverse tracks 58 and the overlying rack sections 63 associated with adjacent hold compartments.

Figure 14B:
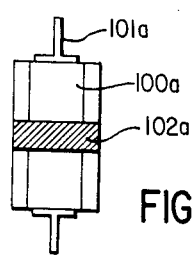

As may best be seen in FIG. 14a and the cross-sectional view of FIG. 14b, each support column 102a presents along each of its two hold-facing inward faces a vertical angle guide 100a. In turn, each angle guide 100a is provided with a vertical T-guide 101a welded to the inward face of the angle guide 100a.

Figure 11A:
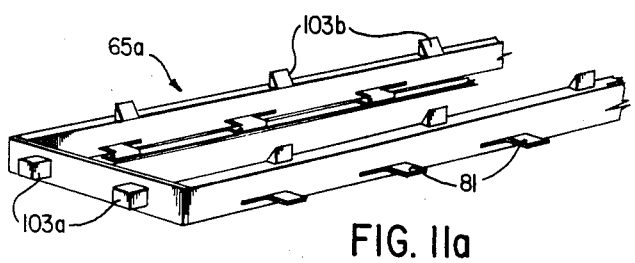
FIG. 11a is a fragmentary perspective view of a preferred embodiment of lifting frame for use with the internal hoisting means.

The structure of the below-deck lifting frame 65a is similar to that of the original embodiment 65 illustrated in FIGS. 7, 11, 12 and 15, except for the number and positioning of projecting members 103a. As illustrated in FIG. 11a, the projecting members 103a of below-deck lifting frame 65a are short guide lugs extending longitudinally outwardly in symmetric pairs from opposite ends of lifting frame 65a and are adapted to engage opposed faces of adjacent T-guides 101a to restrain lateral movement of lifting frame 65a as described below with reference to FIG. 15a.

Figure 15A:
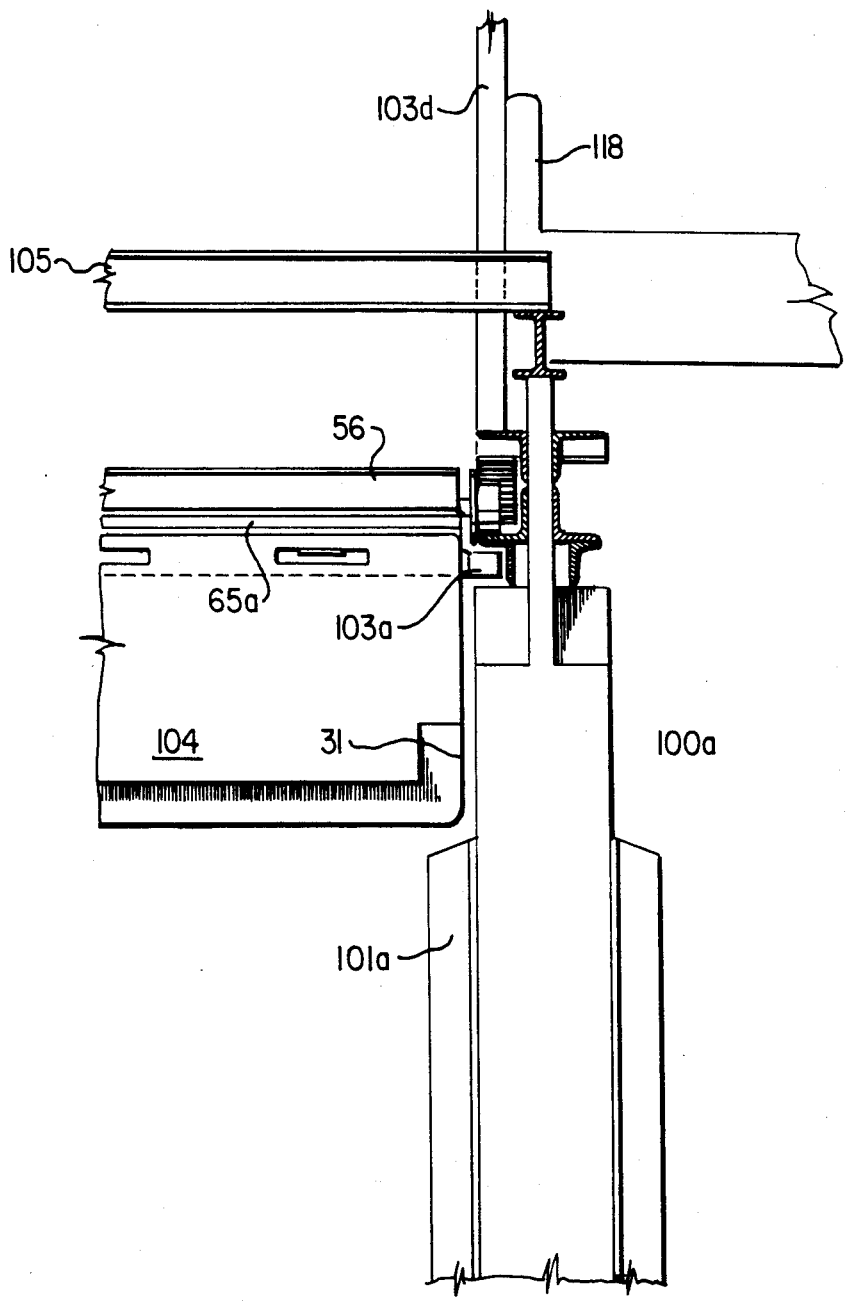
FIG. 15a is a fragmentary side elevational view of an in-hold transverse travelling hoist with lifting frame engaging a container at the top extent of its vertical travel within a hold compartment, indicating the operation of a presently preferred construction and arrangement of below and above-deck restraint devices depicted in FIG. 14b.

As seen from FIGS. 14a and 15a, the vertical extent of the angle guides 100a is such that lifting frame 65a of the internal hoisting means is restricted to vertical movement, except when raised to the top extent of its travel, by the engagement of projecting members 103a with the sides of the angle guides 100a. When raised to the top limit of its travel, lifting frame 65a is in close proximity to the travelling framework 56, and so restrained against lateral oscillation with respect to travelling framework 56. Bevel guides 103b distributed along the upper portions of the long sides of lower lifting frame 65a, as seen in FIG. 11a, assist the mating and stabilization of frame 65a against travelling frame 56.

Similarly, container 104, a container at the end of a longitudinal row of containers engaged by lifting frame 65a, is itself restrained from transverse movement when positioned below its highest point of vertical travel within the hold by the two vertical T-guides 101a located at either side of container 104.

In FIG. 15a, 103d indicates the vertical factory deck guides which stabilize the lifting frame of the presently preferred external conveying means to be described in detail below. A perimetral section of the hatchway leading into the hold compartment is indicated at 105; the hatch coaming is indicated at 118.

Figure 16A:
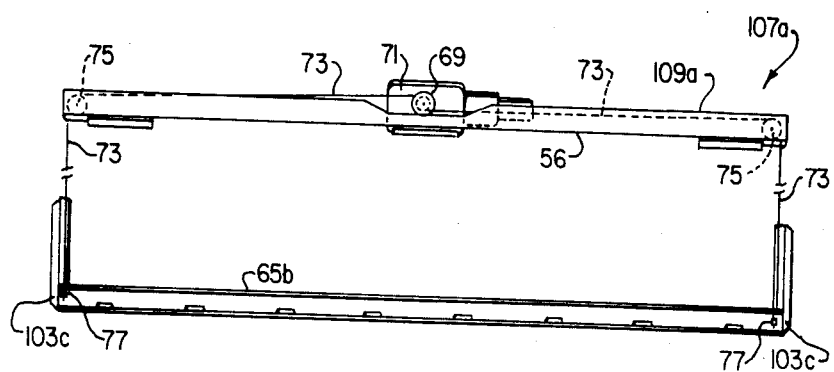
FIG. 16a is a side elevation view of one of the above-deck stationary hoists used in a presently preferred embodiment showing the upper lifting frame suspended from the upper bridge hoist.

(2) Presently Preferred Embodiment of External Conveying Means and Above-deck Restraint Devices In the presently preferred embodiment, the external conveying means does not include a longitudinal travelling hoist. Rather, a stationary hoist as illustrated in FIGS. 16a and 16b is mounted to the underside of the upper deck directly over the hatchway of each hold compartment.

The above-deck stationary hoist 107a includes a stationary upper bridge hoist 109a and a rectangular upper lifting frame 65b. Like the lower rectangular lifting frame described in connection with FIG. 11a and like the original embodiment of lifting frame of FIG. 11 associated with either the in-hold transverse travelling hoist of FIG. 7 or the above-deck longitudinal travelling hoist of FIG. 16, upper lifting frame 65b of FIG. 16a includes means for gripping and releasing a row of containers and power means for effecting vertical travel of the lifting frame with respect to the upper bridge hoist. FIG. 16a illustrates the use of a four-drum winch 69 to extend or retract cables 73 which are looped over four pulleys 75 disposed towards the four corners of upper lifting frame 65b, as shown at 77 in FIG. 16a.

Figure 16B:
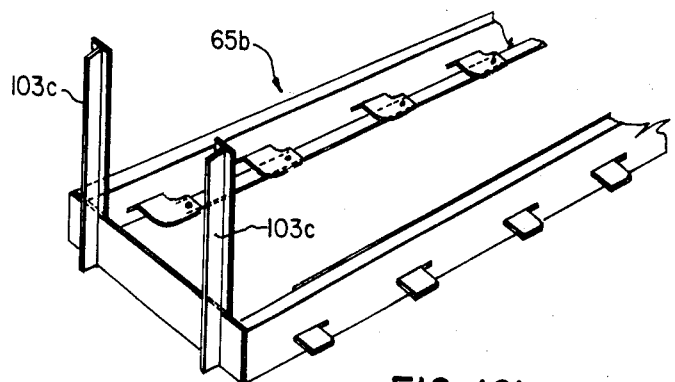

As best seen in FIG. 16b, the upper lifting frame 65b is provided with long thin vertical frame guides 103c in opposed pairs at opposite ends of upper lifting frame 65b. The spacing of the vertical frame guides 103c corresponds to the spacing of the projecting members 103a of the below-deck lifting frame, so that once the upper lifting frame is lowered into its corresponding hold compartment it is stabilized by engagement of its vertical frame guides 103c with corresponding angle guides 100a of the below-deck restraints.

Figure 13B:
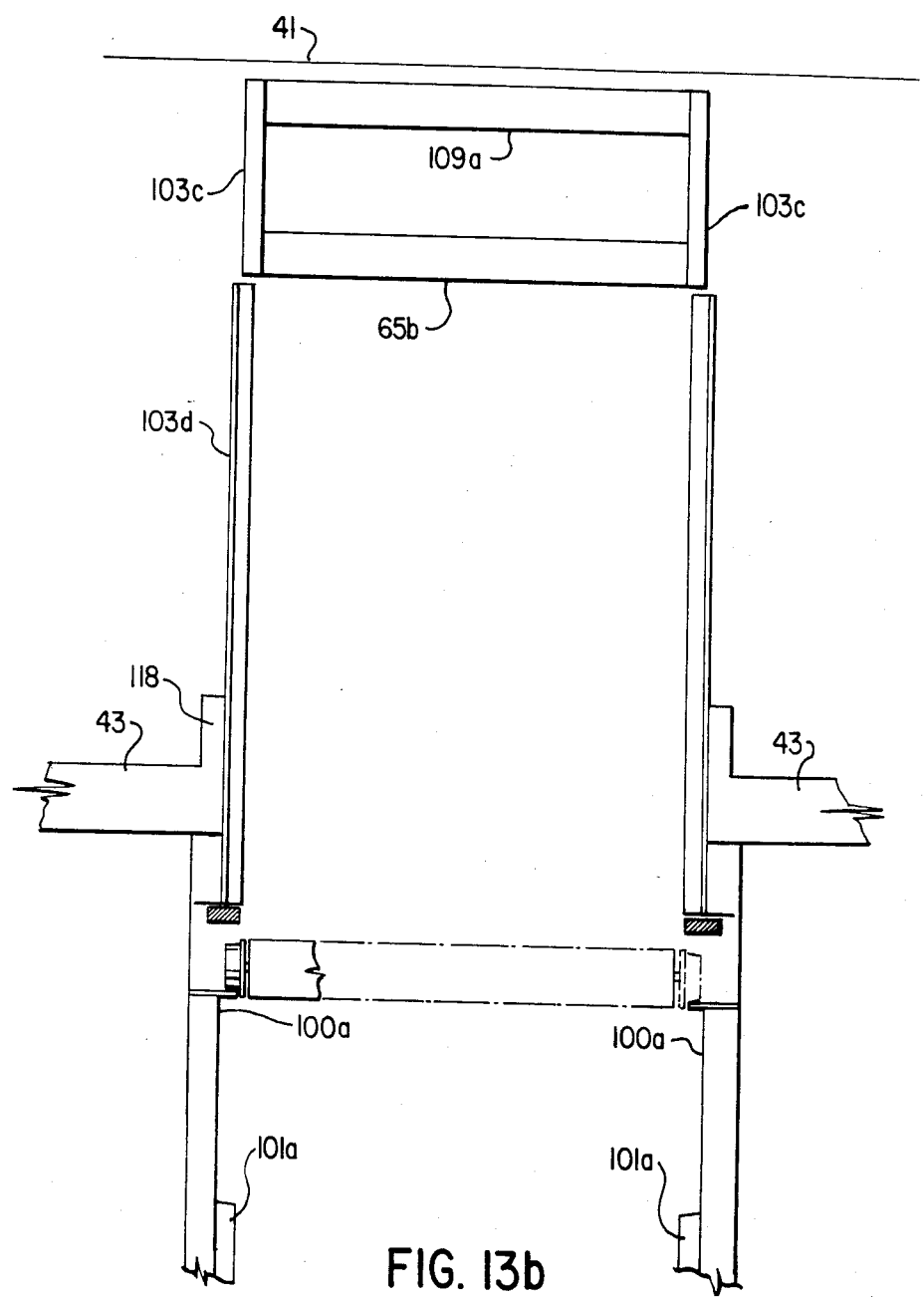

Stabilization of the upper lifting frame against undesired swinging when it is vertically positioned above the angle guides 100a is achieved by the provision in the presently preferred embodiment of vertical factory deck guides 103d extending vertically upward from a position below the working deck 43, at least to a position just below the upper limit position of upper lifting frame 65b, as shown in FIGS. 13a and 13b. Factory deck guides 103d are configured for mating engagement with vertical frame guides 103c to permit relative sliding movement but to restrain swinging of upper lifting frame 65b.

Accordingly, at no position along its vertical path of travel is upper lifting frame 65b free to swing. At the upper limit of travel, lifting frame 65b is stabilized at least by engagement with upper bridge hoist 109a. Below deck, the vertical frame guides 103c are stabilized by the angle guides 100a and at all intermediate positions by the factory deck guides 103d.

As will be described below, the operations scheme for charging and loading containers with fish and ice into the hold compartments of a trawler during fishing operations at sea entails the transfer of rows of containers between different hold compartments. In the original embodiments this is accomplished by means of the above-deck longitudinal travelling hoist 107 illustrated in FIG. 16 and described above in connection with that figure.

Figure 19:
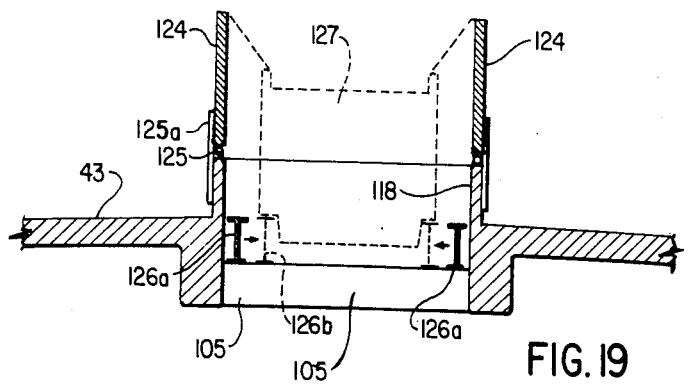
FIG. 19 is a cross sectional view through the factory deck of an outwardly opening hinged hatch cover and movable container support means which may be used as an alternative to the transverse moving framework of FIG. 17.

In the presently preferred embodiment, the external conveying means includes deck rail-mounted roller means for movement of a row of containers between hold compartments. By way of comparison, FIG. 19 illustrates a transverse cross-sectional view through factory deck 43 in the vicinity of hatchway 105 in an original embodiment of the invention wherein the space directly over a hatchway 105 is used as a working station for the charging of a row of containers with fish and ice during fishing operations. The hatch cover comprises first and second cover portions 124 pivotally mounted to opposed long sides of hatch coaming 118 as indicated at 125, for swinging movement away from hatchway 105 to a substantially vertical open position; swinging movement beyond this open position is prevented by members 125a which extend vertically above and below pivot 125. Hinged cover portions 124 may be swung from their substantially vertical open position toward the top surface of hatch coaming 118 to a substantially horizontal closed position resting against the top surface of hatch coaming 118 and substantially occluding hatchway 105.

Parallel longitudinal support beams 126 are joined to movable supports at each end of the hold compartment. The support beams 126 are operable to be selectively moved between an open configuration 126a, which permits containers to pass through hatchway 105, and a closed configuration 126b, shown in dotted outline, in which the support beams are positioned to support a row of containers 127, shown in dotted outline, in hatchway 105 within the perimeter of hatch coaming 118, by engagement of the recessed portion of the bottom of containers 127.

In the original embodiment shown in FIG. 19, the row of containers 127 supported in the hatchway by beams positioned at 126b may be lifted and transported longitudinally be longitudinal travelling hoist 107.

Figure 19A:
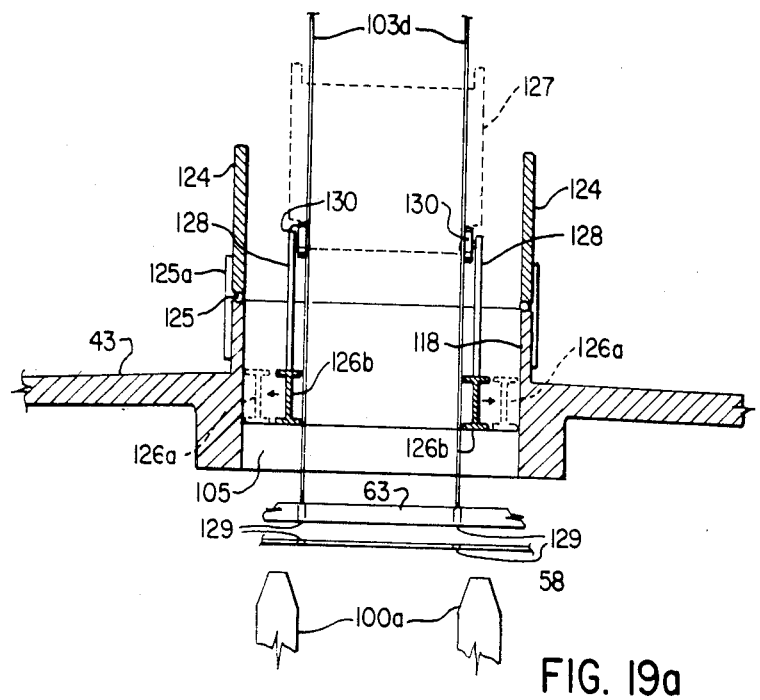
FIG. 19a is a transverse cross-sectional view through the factory deck of an outwardly opening hinged hatch cover including movable container support means provided with roller means for longitudinal conveyance of containers from one hold compartment to another.

FIG. 19a presents a similar view to that of FIG. 19, showing a presently preferred arrangement in which the support beams 126 present vertical roller-topped extension pieces 128. Again, the support beams are operable to be moved between an open configuration 126a (shown in dotted outline) permitting containers to pass through hatchway 105 and, a closed configuration 126b, in which the roller tops of extension pieces are positioned to support a row of containers 127, shown in dotted outline at a level above the top of hatch coaming 118. The row of containers may then be rolled along the centerline of the ship to the roller topped extensions of the support beams of the hatchway over another hold compartment via a series of roller-topped extension pieces (not shown) extending upwardly from parallel track sections extending between the several hatchways.

However, as seen from FIG. 19a, the spacing between the vertical factory deck guides 103d described above is narrower than the width of the row of containers 127, so that at least a section of the factory deck guides must be operable to be shifted laterally apart to permit longitudinal movement of a row of containers from the roller-topped beams supporting the row of containers within a hatchway and onto the train of roller conveyors leading to the next hatchway.

FIG. 19a also illustrates that the use of vertical frame guides 103c affixed to upper lifting frame 65b in association with factory deck guides 103d as described above requires that slots 129 aligned with vertical frame guides 103c be cut through the rack section 63 and the flanges of transverse track 58 in order to allow passage of the upper lifting frame 65b past the rack sections and transverse track into or out of a hold compartment. FIG. 19a illustrates the relative lateral spacing of the factory deck guides 103d, the below-deck angle guides 100a and the slots 129 through the transverse members below the level of main deck 43.

A modification to the roller conveyor system of the external conveying means in the presently preferred embodiment is now described in connection with FIG. 19b. This arrangement contemplates a construction of trawler main deck in which there is a single continuous longitudinal hatchway extending over all of the hold compartments, rather than separate hatch coamings and hatch coverings for each hold compartment. In this case, there is no need for on-deck longitudinal track sections presenting roller-topped vertical extension pieces to mate end-to-end with the roller-topped extension pieces of the movable support beams associated with each hold compartment.

Figure 19B:
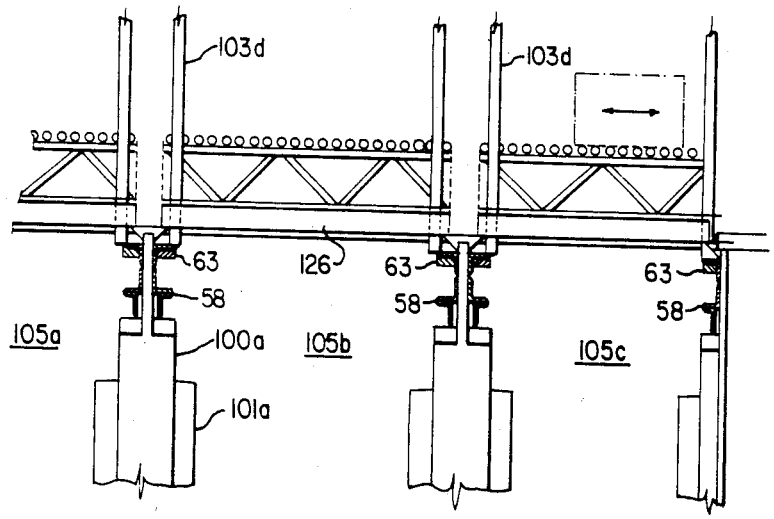
FIG. 19b is a partial cross-sectional view along the length of a continuous hatchway of a trawler showing a preferred embodiment of roller conveyor means for longitudinal conveyance of containers from one hold compartment to another.

FIG. 19b shows a vertical cross-sectional view along three adjacent hold compartments 105a, 105b and 105c. All of the longitudinal container support beams 126 within the continuous hatchway are fitted with rollers 130 that support the indented undersides of containers when support beams 126 are shifted together in the closed position.

Figure 14C:
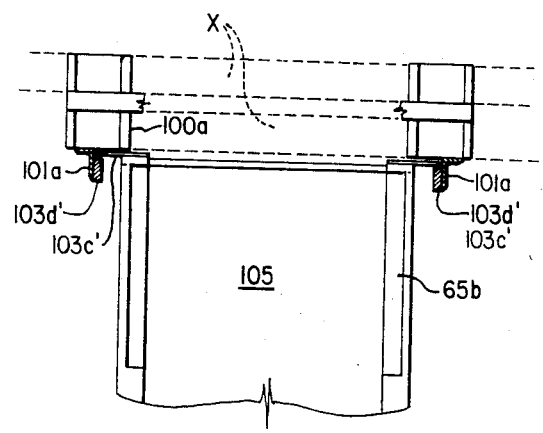
FIG. 14c is a partial plan view of a typical hold compartment showing an alternative preferred construction of guides and restraints.

The requirement for shiftable sections of factory deck guides 103d to allow for the passage of containers along the roller conveyors leading between hold compartments can be avoided by means of an alternative arrangement of above and below-deck guides and restraints illustrated in FIG. 14c. FIG. 14c shows in a partial plan view into a hold compartment a different arrangement of vertical frame guides 103c' positioned at the corners of upper lifting frame 65b and extending horizontally so that the vertical frame guides are spaced apart a greater distance than the width of the containers. The vertical frame guides 103c' stabilize the upper lifting frame against undesired transverse movement in passing into or out of hatchway 105, by running vertically in channels defined by the inner face of an angle guide 100a and a vertical factory deck guide 103d' fastened to T-guide 100a.

In this arrangement of laterally rather than longitudinally extending vertical frame guides 103' and associated vertical factory deck guides 103d', the spacing between adjacent T-guides 101a must be slightly greater than in the arrangement of below-deck restraints described in connection with FIGS. 13a, 14a and 14b. Accordingly, the projecting members 103a on the below-deck lifting frame are also positioned to the corners of that frame for transverse stabilization by the T-guides 101a in the embodiment of FIG. 14c. As in the alternative embodiment of FIGS. 13a, 14a, 14b and 15a, the spacing between adjacent angle guides 100a is unchanged and containers gripped and held in the hold compartment below their maximum elevation are stabilized by abutment against the sides of angle guides 100a.

A further advantage presented by the arrangement of guides and restraints shown in FIG. 14c is that it obviates the need for slots to be cut into the rack or roller support beams, the line of which is indicated in dotted outline at X, to allow passage at the vertical frame guide 103c'.

3. Presently Preferred Embodiment of Internal Hoisting Means

Figure 6A:
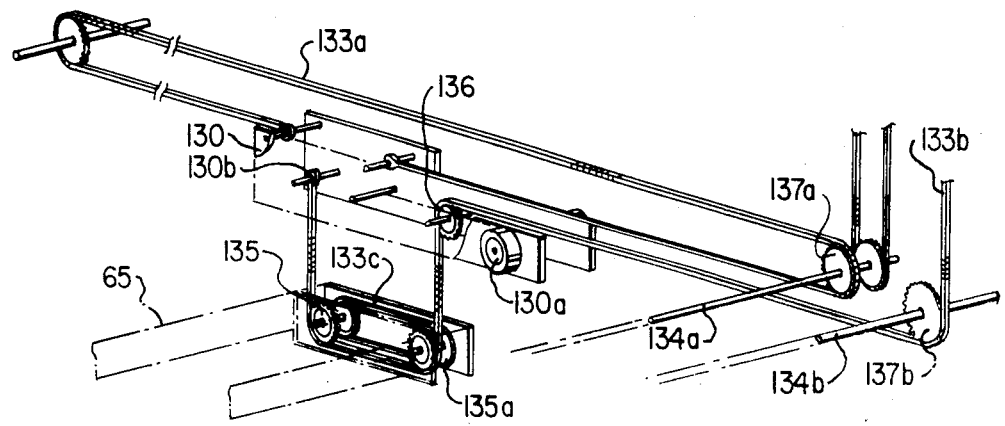
FIG. 6a is a partial perspective view of a presently preferred embodiment of internal hoisting means for use within a fish hold compartment.
Figure 6B:
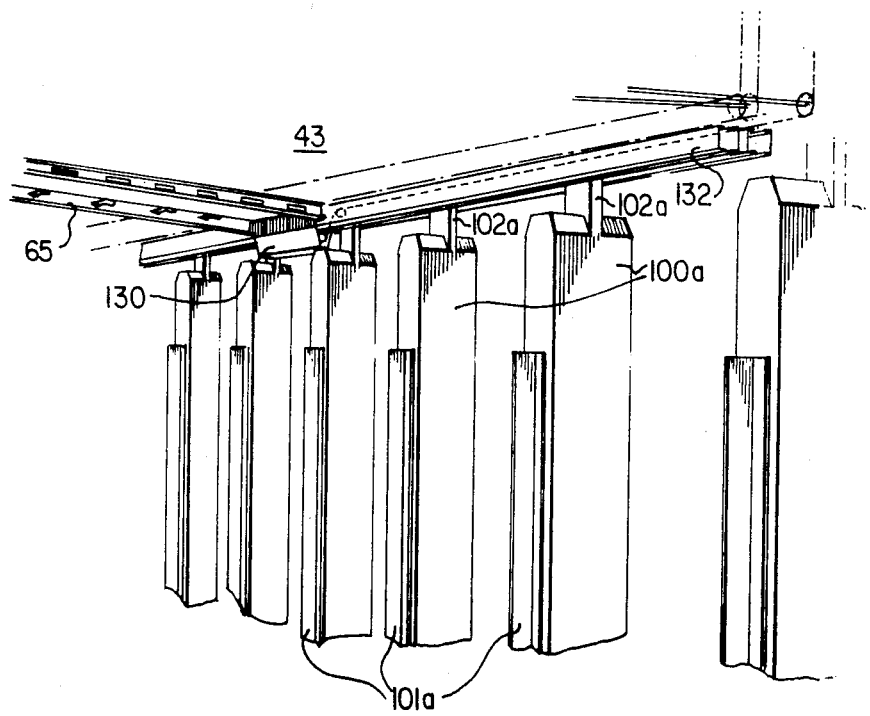
FIG. 6b is a partial perspective view of the interior of a fish hold compartment showing the manner of installation of the internal hoisting means of FIG. 6a for transverse movement along the underside of the working deck.
Figure 8:
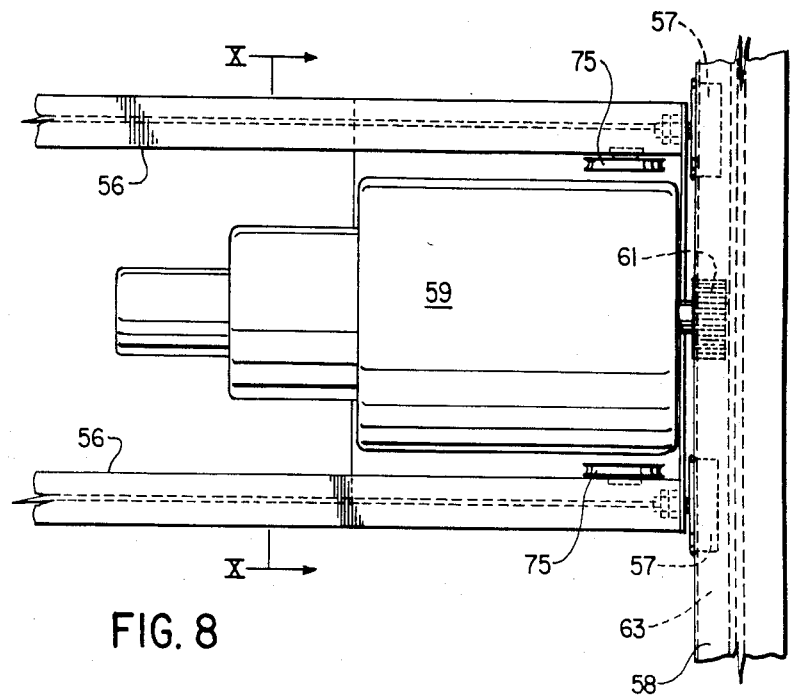
FIG. 8 is an enlarged partial top plan view of the traveling framework of FIG. 6 showing in dotted outline the mechanism of engagement of one end pair of framework rollers with the corresponding transverse track.
Figure 9:
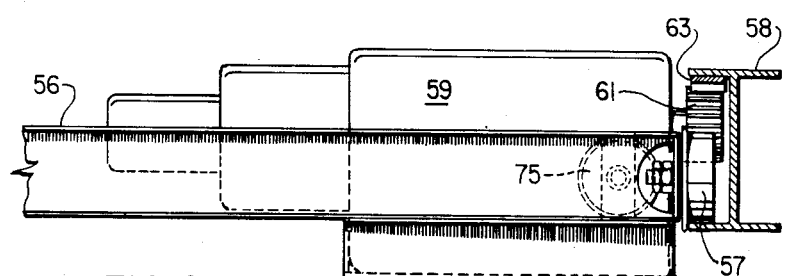
FIG. 9 is a side elevation view of the portion of the travelling framework shown in FIG. 8.
Figure 10:
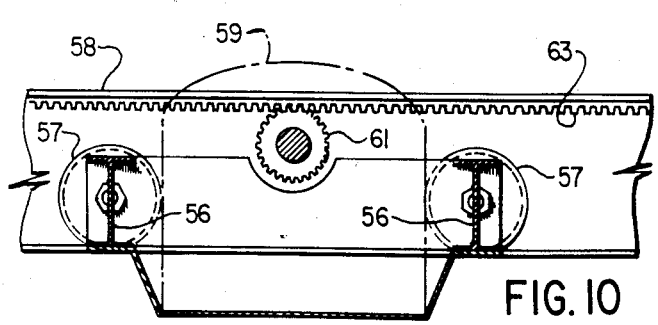
FIG. 10 is an end elevational view of FIG. 8 along the section X—X, partly broken away to reveal the mechanism of engagement of one end pair of framework rollers with tne corresponding transverse track.

FIGS. 6a and 6b illustrate a presently preferred embodiment of internal hoisting means comprising a lifting frame 65 similar to that described above in connection with FIGS. 7, 11 and 12, but without any associated travelling framework carrying its own power drive means, viz. the transverse travelling frame 56 of FIGS. 7, 11 and 12. Instead, as seen in FIGS. 6a and 6b two small carriers 130 running on trolley wheels 130a in double channels 132 mounted transversely within the hold at each end of the hold compartment just below the factory deck 43 are caused to move horizontally by a factory deck mounted power drive unit (not shown) engaging two roller chains 133a, located at the respective ends of the hold compartment. For the sake of simplicity, only one end of the lifting frame 65 and associated carrier, chains, shafts and sprockets are shown in FIGS. 6a and 6b. The mechanical arrangements of components at the respective ends of the frame are exactly symmetrical.

A long shaft 134a connects corresponding driven sprockets 137a at opposite ends of the hold compartment. A second pair of chains 133b, fastened at one end 130b of the respective carriers 130, and passing around two sprockets 135 mounted at the respective ends of lifting frame 65 and thence around an idler sprocket 136 at the opposite end of each carrier 130 and back to the drive unit suspends the lifting frame 65 beneath the carriers. A second long shaft 134b connects the two lifter drive sprockets 137b which engage the chains 133b at the respective ends of the compartment. As will be evident from FIG. 6a, the carriers may be moved horizontally, with the lifting frame remaining at a fixed height, by suitably synchronizing the motions of roller chains 133a and roller chains 133b. When chains 133a are held stationary, to hold the carriers fixed over a row of containers, motion of the chains 133b causes the lifting frame to be raised or lowered as required.

Level orientation of lifting frame 65 is ensured by mechanically linking each set of sprockets 135 by a roller chain 133c passing over two sprockets 135a keyed to the shafts carrying sprockets 135.

Operation of a Fishing Vessel Equipped with the Containers and Various Embodiments of Internal Hoisting Means and External Conveying Means of the Invention.

Methods of operation of a fishing trawler provided with the containers and various embodiments of hoisting apparatus used in the trawler containerization system of the present invention will now be described.

A trawler will leave port with each hold compartment but the largest (or, one of the largest, if there is more than one hold compartment of maximum size) filled to capacity with containers stacked in longitudinal rows as described above. The remaining compartment is partially filled, space to accommodate a complete layer of containers being left vacant at the top of the compartment. As shown in FIG. 4, a number of containers corresponding to the capacity of the vacant top layer next below the factory deck in the partially-filled hold compartment are kept above the factory deck in container storage system 49 prior to the commencement of fishing operations. The containers so stored are the last to be charged with fish and ice.

A predetermined proportion of the containers placed within the hold compartments and the factory deck storage system in readiness for fishing operations is filled with ice for use in the packing of all containers with fish and ice. The ratio of ice-filled to empty containers will depend upon the anticipated requirements for the catch. In the following description it will be assumed for simplicity that the length of each horizontal row of containers within the hold is four containers and that a single container full of ice is sufficient to ice four containers of fish. In that event, each longitudinal row will consist of three empty containers and one filled with ice.

When fishing commences, the in-hold travelling hoist 53 of the largest hold compartment is positioned over the vertical stack of containers located directly below hatchway 105. With the embodiment of internal-hoisting means described in connection with FIGS. 6a and 6b, the carriers 130 are centrally positioned over the ends of that vertical stack. The lifting device is then lowered and as shown in FIG. 5a, the top row 55 of four containers is engaged and raised sufficiently to clear adjacent rows of containers and the restraints of the vertical channel guides and T-section members. In this position, sizeable oscillations of the containers held by the travelling hoist owing to vessel movement are prevented by contact with the travelling framework.

The top row of the central vertical stack is deposited by the internal hoisting means on a vertical stack to the side of the hold compartment, and successive rows are similarly raised and positioned to the side, until the bottom row 106 of the central vertical stack is uncovered, as shown in FIG. 5b.

According to an original embodiment of the invention, the uncovered bottom row of containers 106 below the hatchway is then engaged by the lifting frame of the above-deck travelling hoist and is raised out of the hold compartment to its maximum elevation, whereupon the deck-mounted transverse moving frame is positioned over the hatch directly below the raised row of containers. This row of containers is then lowered on to the transverse moving frame 114 of FIG. 17, as shown in FIG. 5c. The transverse moving frame may then be returned with the one ice-filled and three empty containers to its original position on the factory deck adjacent and parallel to the hatchway.

Alternatively, transverse moving frame 114 may serve to hold a row of containers over hatchway 105 for filling with fish and ice, rather than transporting the containers to a working area laterally displaced from the hatchway. Vertical end and side restraints 119 around frame 114 serve as support for the containers, and the framework itself serves as a cover over hatchway 105 to prevent fish and ice from accidentally falling into the hold.

The covers of the four containers are removed, the ice-filled container is overturned by suitable dumping apparatus and the contents charged into an ice hopper screw feeder unit. The container emptied of its ice is returned to its position in the horizontal row of containers on the travelling framework and all four containers are charged with fish and ice either simultaneously or in succession, the ice feeder unit being operated to feed the correct proportion of ice into each container.

Figure 5D:
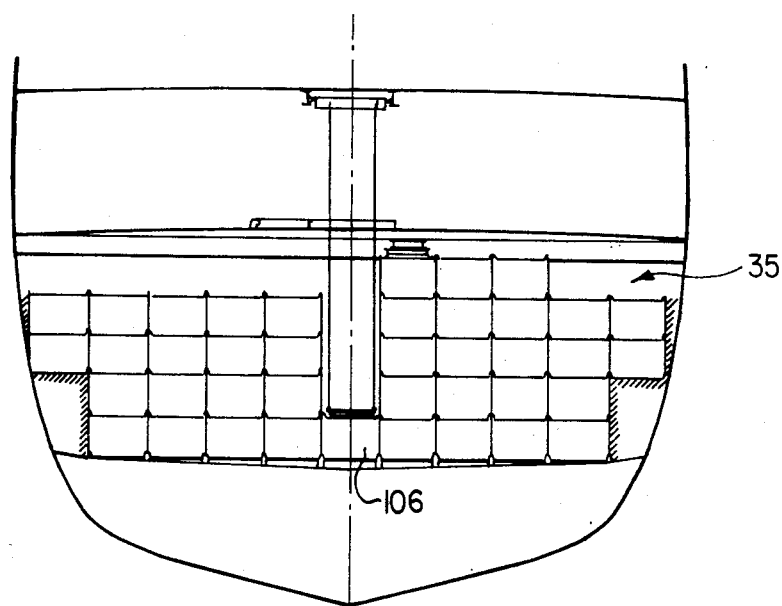
Figure 6:
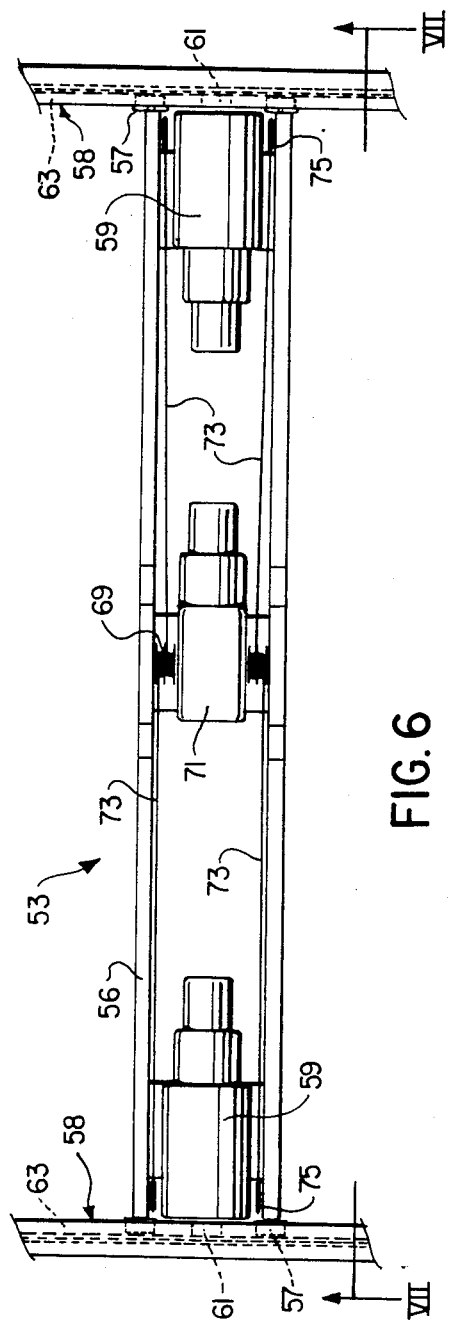
FIG. 6 is a top plan view of the travelling framework of an in-hold transverse travelling hoist mounted for travel along transverse beams affixed to the underside of the working deck of a fish hold compartment.

Alternatively, ice may be manually distributed among the four containers of a row in a working position as follows: As fish are loaded into two of the three empty containers, ice from the initially ice-filled container is shovelled into each of them. When those two containers have been charged with fish and ice, the originally ice-filled container is manually moved from its position sufficiently to insert a "floating" empty container, which is charged with fish and ice along with the remaining container. The now-empty, originally ice-filled container then serves as the "floating" container for the next set of four. When all four containers have been charged, the covers are replaced and the travelling framework positioned over the hatchway (if not already there). The containers are then engaged by the longitudinal travelling hoist and raised sufficiently to permit retraction of the transverse travelling framework. The row of containers 106 is then lowered through the hatchway to its original position at the bottom of the hold compartment, as shown in FIG. 5d.

The next row of containers which had been placed in the top level of the hold compartment away from the hatchway is then transferred by the in-hold travelling hoist to a position directly beneath the hatchway and is lowered and deposited on to the first row of containers filled. The in-hold travelling hoist is then withdrawn and the row of containers is removed, charged with fish and ice and replaced in its original position, second from the bottom of the central vertical stack, in like manner as the bottom row of containers.

This operation is repeated until each row of the central vertical stack has been returned to its original position after being filled with ice and fish.

A second vertical stack of containers is then transferred row by row to adjacent temporary storage positions in the top layer space of the hold to one side of the hatchway. The stack of filled containers directly below the hatch then serves as a working platform to the top of which each temporarily stored row of containers from the second vertical stack is transferred by the in-hold travelling hoist for removal to the charging area by the above-deck hoisting system. After charging with fish and ice, a row of containers is placed back on the top of the central stack of filled containers and thence deposited in its original position in the second vertical stack by the in-hold travelling hoist.

The operations carried out on the second vertical stack of containers are then repeated for each of the remaining stacks within the hold. That is, all remaining containers in the first hold compartment are similarly successively transferred by the in-hold hoist system to a position directly below the hatchway, where they are picked up by the above-deck hoisting system, deposited in the transverse moving frame, charged with fish and ice and returned to the hold to the same positions they occupied prior to removal.

When all containers in the first hold have thus been filled with fish and ice, the above-deck travelling hoist is moved longitudinally along the underside of the upper deck and positioned over the second hold compartment. The top layer of containers in this hold compartment is removed row-by-row, filled with fish and ice and placed within the empty upper level of the first hold compartment. Loading of the second hold compartment then proceeds in the manner described above with reference to FIGS. 5a to 5d for the first hold compartment.

In like manner, loading of containers proceeds from hold compartment to hold compartment until all the remaining rows of containers which were originally stored in the hold have been removed, filled with fish and ice, and replaced. Those containers which were originally stored in the on-deck storage system are next moved, either manually or by means of a suitable overhead track and trolley system (not shown) into place on the transverse moving frame associated with the working deck of a hold compartment and are charged with fish and ice in the manner described above. Successive loaded rows from the above deck storage system are then used in loading the remaining empty spaces of the last compartment, whereupon the trawler returns to port with all hold compartments filled.

In the operation described above, it is necessary to have a transverse-moving frame on the working deck at only one of the compartment hatchways and to conduct container filling operations in the vicinity of that hatchway alone. The longitudinally moving above-deck hoist then serves to transfer a row of containers raised from within any of the hold compartments to a position over the hatchway of the one working deck. By using a longitudinally-travelling above-deck hoist to transfer a row of containers between its below-deck storage position and a working position on a platform positioned either directly over or to one side of the hatchway of the largest hold compartment (which is ordinarily located towards the stern of the ship and nearer the actual fishing operations than the other hold compartments), while at the same time locating the on-deck container storage area over the other hold compartments, more deck space is provided above the deck of the largest hold compartment for ice-feeding equipment, and the length of conventional fish conveyor is minimized.

Figure 18A:
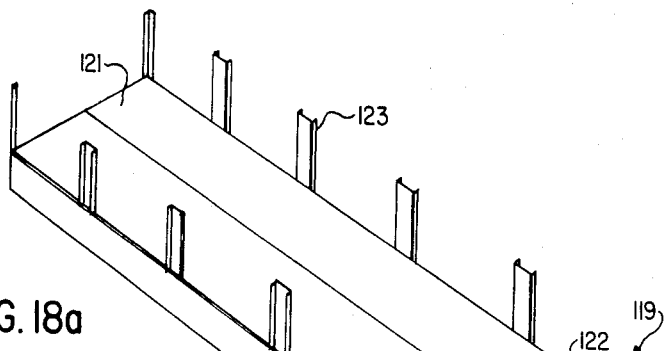
FIG. 18a is a perspective view of an outwardly opening hinged hatch cover with vertically extending container side restraints which may be used as an alternative to the transverse moving framework of FIG. 17.
Figure 18B:
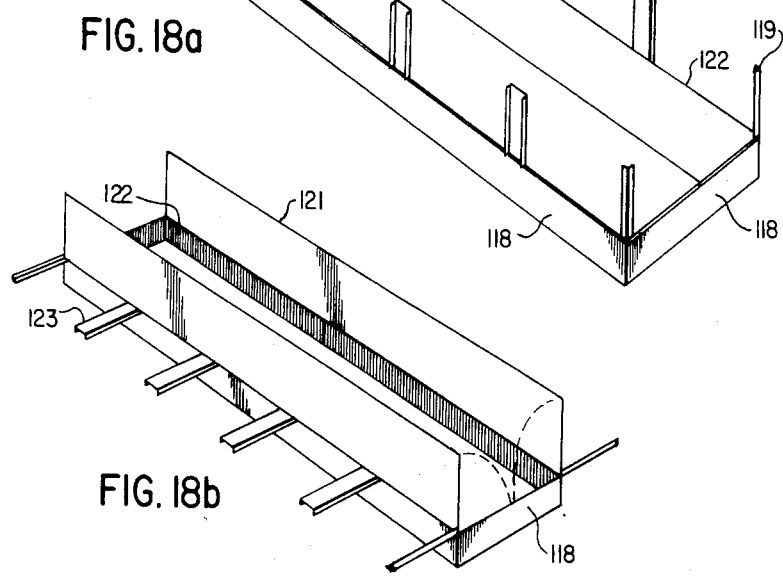
FIG. 18b is a perspective view of the hatch cover of FIG. 18a showing the hatch cover in the open position.

In an alternative embodiment of the invention, illustrated in FIGS. 18a and 18b, the transverse moving frame of FIG. 17 may be omitted and each hold compartment provided with a hatch cover hingedly mounted to the coaming 118 of the hatchway 105 through the overlying deck for swinging open to allow the passage of a row of containers, as shown in FIG. 18b. In the closed position shown in FIG. 18a, hinged hatch covers 121 fold down along hinged sections 122 to provide a working station for the loading of fish and ice into a row of containers in the manner described above. Peripheral upstanding support members 123 are designed to hold a row of containers securely over the closed hatch cover and to extend horizontally outwardly from the hatch coaming 118 when the hatch cover is open. For use with this alternative embodiment, the single longitudinal travelling hoist of FIG. 16 may be replaced by a series of fixed vertical hoists located above the hatchway cover of each hold compartment, whereby filling of containers is carried out at work stations above each hatchway. This embodiment permits all hold compartments to be operated simultaneously during the discharge and filling operations in port, thereby increasing the rate at which those operations can be performed.

In a further alternative embodiment illustrated in FIG. 19, the transverse moving frame of FIG. 17 may again be omitted and each hold compartment provided with movable container support means located within each hatchway at the level of the factory deck. In the transverse cross-sectional view through factory deck 43 in the vicinity of hatchway 105, shown in FIG. 19, the hatch cover comprises first and second cover portions 124 pivotally mounted to opposed long sides of hatch coaming 118 along the top outer edges thereof as indicated at 125, for swinging movement away from hatchway 105 to a substantially vertical open position; swinging movement beyond this open position is prevented by members 125a which extend vertically above and below pivot 125. Hinged cover portions 124 may be swung from their substantially vertical open position toward the top surface of hatch coaming 118 to a substantially horizontal closed position resting against the top surface of hatch coaming 118 and substantially occluding hatchway 105.

Parallel longitudinal support beams 126 are joined to movable supports at each end of the hold compartment. The support beams 126 are operable to be selectively moved between an open configuration 126, which permits containers to pass through hatchway 105, and a closed configuration 126a, shown in dotted outline, in which the support beams are positioned to support a row of containers 127, shown in dotted outline, in hatchway 105 within the perimeter of hatch coaming 118, by engagement of the recessed portion of the bottom of containers 127.

In the operation of a system incorporating the embodiment of FIG. 19, a row of containers which has been hoisted above hatchway 105 may be lowered and supported at the factory deck level within the perimeter of coaming 118 by beams positioned at 126a. The lifting lugs of the lifting frame of the above deck hoist are then disengaged, whereupon the covers of the containers 127 may be removed and the containers charged with fish and ice. Immediately prior to the charging of containers held within the hatchway at factory deck level in this manner, auxiliary covers 128 may be put into position to prevent fish and ice from falling into the hold through hatchway 105 during the charging operation.

In employing the presently preferred embodiment of external conveying means illustrated in FIGS. 16a, 19a and 19b and described above in connection with those figures, the cycle of operations for charging rows of containers with fish and ice and transporting them between working and storage positions is similar to operations employing earlier embodiments.

Each hold compartment is associated with an overhead stationary hoist 107a of the kind illustrated in FIG. 16a, whereby filling of containers is carried out at work stations above each hatchway. A row of containers which has been hoisted above hatchway 105 may be lowered and supported on roller conveyor means extending up from the factory deck level within the perimeter of coaming 118 by roller-topped beams 126.

As seen in FIG. 19a, the working position at which a row of containers is charged with fish and ice in the manner described above is atop the roller topped extensions 128 of support beams 126d in their closed position. The lifting lugs of upper lifting frame 65a of hoist 107a are then disengaged, and the lifting frame 65a is raised out of the way, whereupon the covers of the containers may be removed and the containers charged with fish and ice.

As described above, the cyclic operation of charging and storing containers during fishing operations require external conveying means which are operable, inter alia, to remove the charged containers from the top layer of one hold compartment and to place them within the empty upper level of another hold compartment. In the presently preferred embodiment, this aspect of the operation is carried out by means of the roller conveyor system illustrated in FIG. 19a and earlier described in connection with that figure.

Turning finally to the discharge of containers filled with fish and ice when the fishing vessel returns to port, it is readily seen that this may be achieved by the combined use of the in-hold travelling hoist to place a row of containers laterally displaced from the hatchway on top of that row of containers immediately below the hatchway, whence the on-deck hoist removes that row for placement on deck and subsequent removal from the vessel. Thus, as was the case in respect of the filling operations described above, the vertical stack of containers below the hatchway serves as a working platform during discharge as well. To maintain vessel stability, rows of containers will be removed alternately from opposite sides of the vessel.

Removal of containers from the deck of the vessel may be achieved by any suitable conventional means, such as a cargo winch, a conveyor system, a shore-mounted hoist, etc. Maximum rate of discharge will probably best be achieved through the use of a suitably designed conveyor system operating through the side of the vessel to the factory deck area near the hold hatches.

While particular embodiments have been described and shown with reference specifically to fishing trawler containerization, it is to be understood that these embodiments are illustrative only, and that the present invention is not limited thereto, but includes all embodiments falling within the scope and spirit of the appended claims.

The embodiments of the invention in which an exclusive property or privilege is claimed are defined as follows:

1. In a system for the containerization and handling of fish aboard a fishing vessel having a main deck, at least one hold compartment beneath said main deck and a longitudinal opening through said main deck extending in length over substantially the full length of said hold compartment, the combination of:

a plurality of similar stackable fish containers, each said container having a bottom wall, a pair of end walls extending upwardly from opposite ends of said bottom wall, a pair of side walls extending upwardly from opposite sides of said bottom wall vertically beyond the tops of said end walls, the bottom portions of said side walls being inwardly recessed a sufficient amount that the bottom portion of said containers is of a reduced width dimensioned to be matingly received between the extending upper portions of the said walls of a similar container stacked vertically therebelow, said portion of reduced width being of a vertical dimension substantially equal to the vertical dimension of the extended portions of said side walls, said side walls being provided with gripping sites in the vicinity of the upper portions thereof adapted to be engaged by gripping means operating between said side walls;

first hoisting means disposed below said main deck, operable to grip a single longitudinal row of containers positioned within said hold compartment, to raise or lower said row of containers and to transport said row of containers between selected positions within said hold compartment, including a position directly beneath and in alignment with said longitudinal opening, said first hoist means including a lifting frame vertically movable between the vicinity of the underside of said main deck and locations vertically spaced therebelow and horizontally movable between locations within said hold compartment when in the vicinity of the underside of said main deck, said lifting frame being dimensioned for placement between the opposed side flanges of a longitudinal row of containers, and gripping means mounted to said first lifting frame and operable to selectively engage and release said gripping sites of said containers in said longitudinal row;

an array of vertical guide members transversely spaced along each end of said hold compartment adapted to prevent undesired horizontal movement of said rows of containers, while permitting vertical movement of said rows of containers, and to permit horizontal movement of said rows of containers only when said rows of containers have been raised to a location proximate the underside of said deck; and conveying means disposed above said main deck, operable to selectively grip and release a single longitudinal row of containers and to convey said row of containers between said position within said hold compartment directly beneath said longitudinal opening and at least one working position on siad main deck of said fishing vessel.

2. A system as defined in claim 1, wherein said gripping sites comprise slots through said flanges, and wherein said gripping means comprises a plurality of lugs movable between an extended position in which they are operable to extend into and engage said slots, and a retracted position.

3. A system as defined in claim 2, wherein:
said lugs project from a plurality of members pivotally mounted on said lifting frame;
wherein pivotal movement of said members moves said lugs between their extended and retracted positions; and wherein
said lifting frame additionally comprises longitudinal coupling means connected to each of said pivotally mounted members, and actuating means operatively associated with said coupling means for effecting simultaneous extension or retraction of said plurality of lugs.

4. A system as defined in claim 2 or 3, further comprising spring means biasing said lugs towards a normally extended position.

5. A system as defined in claim 1, wherein said array of vertical guide members comprises:
members adapted to engage each end of a row of containers, to prevent undesired horizontal movement of said row, while permitting vertical movement of said row and permitting horizontal movement of said row when said row has been elevated to a locations proximate the underside of said deck; and
members adapted to engage each end of said lifting frame, to prevent undesired horizontal movement of said lifting frame, while permitting vertical movement of said lifting frame and permitting horizontal movement of said frame when said frame has been elevated to a location proximate the underside of said deck.

6. A system as defined in claim 5, wherein the individual containers in at least some of said rows of containers are secured together end to end by removable securing means, to form a unitary row structure.

7. A system as defined in claim 1, wherein said conveying means disposed above said main deck comprises:
a second lifting frame dimensioned for placement between the opposed side flanges of a longitudinal row of containers;
gripping means mounted to said second lifting frame and operable to selectively engage and release the gripping sites of the containers in a longitudinal row; and
second hoisting means operable to raise and lower said second lifting frame through said hatchway.

8. A system as defined in claim 1, further comprising a horizontal framework mounted for travel within said hold compartment adjacent the underside of said main deck between opposed sides of said hold compartment, said lifting frame being operatively connected to and vertically movable with respect to said horizontal framework and adapted to be elevated into close proximity therewith.

9. A system as defined in claim 1, wherein said conveying means comprise stationary hoist means fixedly mounted over said hold compartment and operable to raise and lower a row of containers between said position within said hold compartment directly beneath longitudinal opening and a position above said main deck, said stationary hoist means including,
an upper hoist vertically spaced from said main deck and fixedly mounted thereabove,
a second lifting frame,
suspension means suspending said second lifting frame from said upper hoist, a power mechanism operatively connected to said suspension means for raising and lowering said second lifting frame, said second lifting frame having a plurality of vertical frame guides extending upwardly from the perimeter thereof, said vertical frame guides being operable to assist in stabilizing said second lifting frame, when said second lifting frame is raised to a maximum elevation by said power mechanism, gripping means mounted to said second lifting frame and operable to selectively engage and release the gripping sites of the containers in a longitudinal row, movable object support means associated with said opening, movable between an open configuration which permits a row of containers to pass through said opening, and a closed configuration in which said support means is operable to support a row of containers above said opening, roller conveyor means operable to support containers being moved between a working position directly over said hold compartment and other locations on said main deck; and an array of second vertical guide members extending upwardly from said opening toward the upper hoist associated therewith and adapted to slidably engage said vertical frame guides of the associated second lifting frame to prevent undesired horizontal movement of said second lifting frame, while permitting vertical movement of said second lifting frame.

10. A system as defined in claim 9, wherein said movable object support means associated with each said opening comprises roller-topped members so arranged that said roller-topped members and said roller conveyor means form a continuous track operable to support objects moved therealong, when said movable object support means is in its closed configuration.

11. In a system for the containerization and handling of fish aboard a fishing vessel at sea, said fishing vessel having a main deck, at least one hold compartment beneath said main deck and a longitudinal hatchway through said main deck extending in length over substantially the full length of said hold compartment, the combination of:

a plurality of similar stackable fish containers, each said container having a bottom wall, a pair of end walls extending upwardly from opposite ends of said bottom wall, a pair of side walls extending upwardly from opposite sides of said bottom wall vertically beyond the tops of said end walls, the bottom portions of said side walls being inwardly recessed a sufficient amount that the bottom portion of said containers is of a reduced width dimensioned to be matingly received between the extending upper portions of the side walls of a similar container stacked vertically therebelow, said portion of reduced width being of a vertical dimension substantially equal to the vertical dimension of the extended portions of said side walls, said side walls being provided with gripping sites in the vicinity of the upper portions thereof adapted to be engaged by gripping means operating between said side walls;

hoisting means disposed below said main deck, operable to selectively grip and release said containers at said gripping sites and to convey said containers between selected positions within said hold compartment; and conveying means disposed above said main deck, operable to selectively grip and release said containers and to convey said containers between a location within said hold compartment directly below said hatchway and at least one working position on said main deck of said fishing vessel.

12. A system as defined in claim 11, wherein said hoisting means and said conveying means are operable to grip or release simultaneously a group of containers arranged in a predetermined configuration and to eliminate substantially any relative movement between the containers of any said group when gripped, whereby a said group of containers may be simultaneously conveyed between selected positions within said hold compartment and at least one working position on said main deck of said fishing vessel.

13. A system as defined in claim 12, further comprising restraining means mounted in said hold compartment for preventing undesired horizontal movement of said groups of containers, while permitting vertical movement of said groups of containers, and permitting horizontal movement of said groups of containers only when said groups of containers have been raised to a location proximate the underside of said deck.

14. A system as defined in claim 11, claim 12 or claim 13 wherein:

said gripping sites are opposed longitudinal slots located in said side walls at a uniform vertical distance above the uppermost horizontal edges of said end walls; and said gripping means comprises lugs movable between an extended position in which they are operable to extend into and engage said slots, and a retracted position.

* * * * *